United States Patent [19]
Ullakko

[11] 3,912,869
[45] Oct. 14, 1975

[54] MULTIFREQUENCY-TO-DIGITAL CONVERTER

[75] Inventor: Richard J. Ullakko, Kirkland, Wash.

[73] Assignee: Tel-Tone Corporation, Kirkland, Wash.

[22] Filed: Nov. 21, 1973

[21] Appl. No.: 418,098

[52] U.S. Cl. .......... 179/84 VF
[51] Int. Cl. .......... H04m 1/50; H04q 9/12
[58] Field of Search .......... 179/84 VF; 324/78 D; 330/31

[56] References Cited

UNITED STATES PATENTS

| | | | |
|---|---|---|---|
| 3,293,371 | 12/1966 | Burns et al. | 179/84 VF |
| 3,710,031 | 1/1973 | Sellari | 179/84 VF |
| 3,760,269 | 9/1973 | Beeman et al. | 324/78 D |
| 3,790,720 | 2/1974 | Schartmann | 179/84 VF |

*Primary Examiner*—Kathleen H. Claffy
*Assistant Examiner*—Joseph Popek
*Attorney, Agent, or Firm*—Christensen, O'Connor, Garrison & Havelka

[57] ABSTRACT

A multifrequency-to-digital converter for converting a two-tone multifrequency signal into a digital signal representing the multifrequency signal is disclosed. The incoming multifrequency signal is split into its high frequency and low frequency components. These components are detected and tested to determine if they fall within the high and low frequency ranges of interest, and if at least one component is symmetrical. If one cycle of the components passes these tests, high frequency and low frequency counters start to count clock pulses. If the high frequency and low frequency components continue to pass the tests for a predetermined number of cycles, the counted pulses, which are related to the frequency of the high frequency and low frequency components, are converted into serial pulse trains and compared with binary words stored in a read-only memory (ROM). When high and low frequency comparisons are found, high and low accept signals are generated. If no comparison is found, a reject signal occurs which causes the apparatus of the invention to recycle. If a comparison is found, binary words representing the high frequency and low frequency components are stored in a word file and then decoded to produce an output signal on a digit line peculiarly related to the stored word. To assure error-free operation, the initial analysis may be reperformed before the high and low frequency pulse trains are compared with the ROM words.

25 Claims, 21 Drawing Figures

MULTIFREQUENCY-TO-DIGITAL CONVERTER

BACKGROUND OF THE INVENTION

This invention is related to frequency-to-digital conversion and more particularly to an apparatus for converting multifrequency telephone signals into digital signals related to said telephone signals.

In recent years, push-button telephones have been developed and are replacing many rotary dial telephones. The usual push-button telephone includes twelve buttons representing the digits 0 through 9, an * and a # . When any of the buttons is depressed or pushed, a multifrequency signal composed of a high frequency component and a low frequency component is generated. The high frequency component and the low frequency component combination uniquely identifies the button pushed.

A variety of systems have been proposed for detecting multifrequency signals of the type set forth above and generating a digital representation of each of the twelve tone combinations that can be created by a twelve-button, push-button telephone. U.S. Pat. No. 3,537,001 issued to Friend for "Multifrequency Tone Detector" illustrates one example of a prior art multifrequency tone detector. While some of the prior art systems have been found to be relatively satisfactory in use, none of them are as satisfactory and desirable, for a variety of reasons. For example, many prior art systems, including the system disclosed in the Friend patent, do not provide a means that adequately guards against the detection of tone signals unrelated to the depression of a push button. Thus, these systems generate erroneous digital indications. Such unrelated tone signals can occur because of noise carried by the associated telephone conductor, for example. Another disadvantage of prior art systems is their use of discrete components or separate logic blocks, rather than large-scale integrated circuits.

Therefore, it is an object of this invention to provide a new and improved multifrequency signal detector.

It is a further object of this invention to provide a new and improved apparatus for converting a two-tone multifrequency signal into a digital signal representing the multifrequency signal.

It is a still further object of this invention to provide a new and improved apparatus for converting a multifrequency signal into a digital signal that includes guarding circuits for preventing the generation of false digital signals.

It is a still further object of this invention to provide a new and improved multifrequency-to-digital converter for converting multifrequency signals into digital signals which is suitable for implementation in large-scale integrated circuit form.

SUMMARY OF THE INVENTION

In accordance with principles of this invention, a multifrequency-to-digital converter for converting a multifrequency signal into a digital signal representing the multifrequency signal is provided. The incoming multifrequency signal is split into two representative components. These components are detected and tested to determine if they fall within frequency ranges of interest and if at least one component is symmetrical. While these tests are being performed, frequency counters count clock pulses. If the frequency components pass the tests, the counted pulses, which are related to the frequency of the components, are compared with stored pulse signals. If comparisons for both components are found, accept signals are generated.

In accordance with other principles of this invention, the accept signals activate a word file. The word file stores binary words related to the components. Thereafter, the stored binary words are decoded to produce an output signal on a digit line peculiarly related to the frequency components.

In accordance with further principles of this invention, the frequency components are high frequency and low frequency components.

In accordance with yet other principles of this invention, the majority of the apparatus of the invention, including the means for detecting and testing the high and low frequency components, a read-only memory (for storing the comparison pulses signals) and the word file, plus the gating and timing necessary to the operation of these systems, is suitable for implementation in large-scale integrated circuit form.

In accordance with still further principles of this invention, the testing means for testing whether high and low frequency components fall within the high and low frequency ranges of interest comprises bandpass counters which are activated by edge detecting and synchronizing circuits. The leading edge of a high or low frequency component causes the bandpass counters to count clock pulses for a predetermined period of time, determined by the frequency of the component. At the end of the time period, the bandpass counter output is decoded and, if the pulse count indicates that the component is within the range of interest, a signal is applied to a cycle counter. After a predetermined number of cycles have been successfully tested in this fashion, the cycle counter generates an output signal which causes the pulse count of the related high or low frequency pulse counter to be transferred to the parallel-to-series register for subsequent comparison with the stored (ROM) pulses. In addition, the testing means for determining whether one component is symmetrical comprises two counters, one of which counts during one half of a cycle of the component waveform and the other of which counts during the other half of the cycle. A comparison of the counts in the two counters indicates whether or not symmetry exists. If so, this counter applies a signal to a further cycle counter in its associated channel (high frequency or low frequency, as the case may be).

In accordance with further principles of this invention, after one detection cycle occurs, i.e., the invention has determined that the components of the multifrequency signal are within the range of interest and that one of the components is symmetrical, the system is reset to retest the multifrequency signal. The comparison between the high and low frequency counter counts with the memory pulses does not occur unless the retest is successful.

It will be appreciated from the foregoing brief summary that the invention provides a new and improved multifrequency-to-digital converter for converting a multifrequency signal of the converting generated by depressing a button on a push-button telephone into a digital signal representing the particular button depressed. Because the preferred includes adequate guarding, the erroneous generation of a digital signal is prevented. Guarding is provided by twice testing the multifrequency signal to determine if its components are within the range of interest and if one of the signals is symmetrical. Further guarding is provided by requiring a successful comparison between pulses stored in a read-only memory and pulses related to the detected components. Until all of these tests are successfully passed, the multifrequency signal is rejected. In this manner, assurance that a valid multifrequency signal has been received before a digit signal is generated is provided by the invention.

BRIEF DESCRIPTION OF THE DRAWINGS

The foregoing objects and many of the attendant advantages of this invention will become more readily appreciated as the same becomes better understood by reference to the following detailed description when taken into conjunction with the accompanying drawings, wherein.

DESCRIPTION OF THE PREFERRED EMBODIMENT

Figures 1, 3:
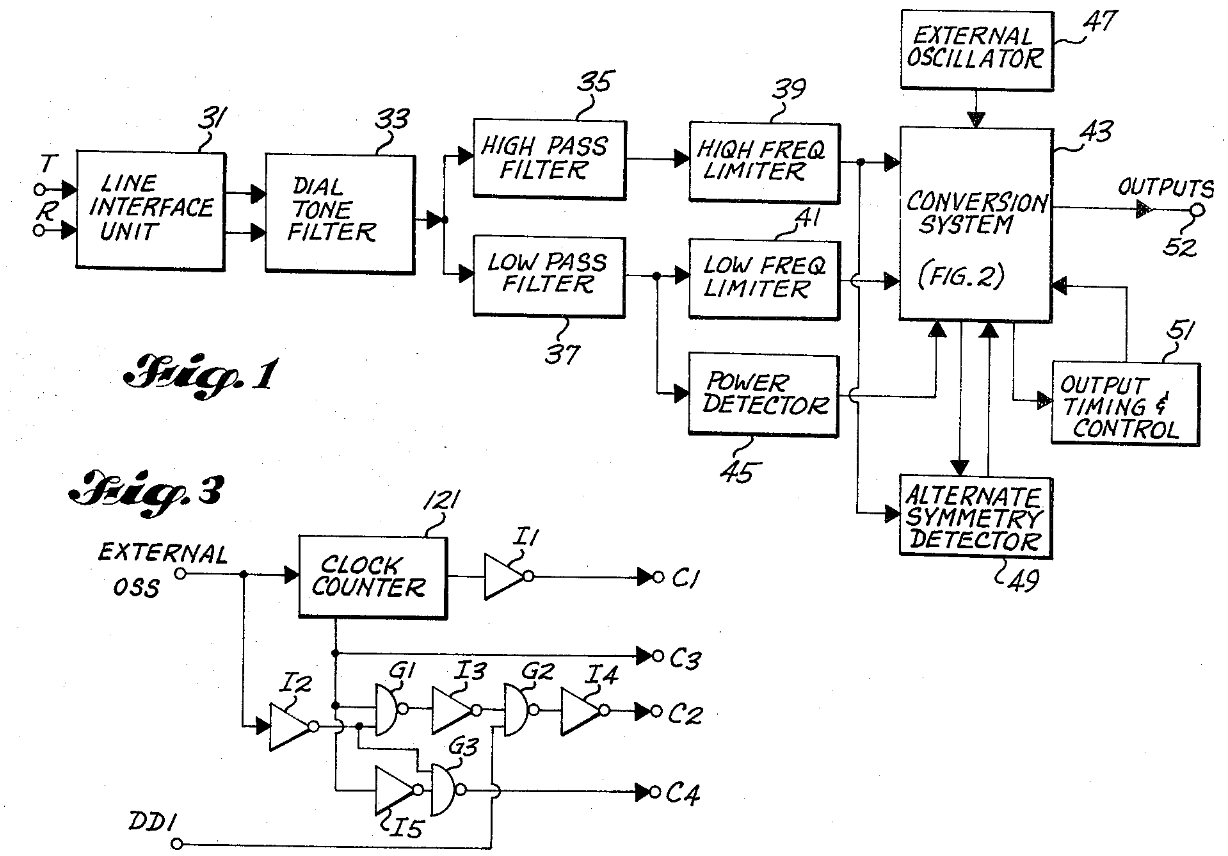
FIG. 1 is a block diagram illustrating a preferred embodiment of the invention.
FIG. 3 is a logic diagram of a clock suitable for use in the conversion system illustrated in FIG. 2.

FIG. 1 is a block diagram illustrating an overall apparatus formed in accordance with the invention that includes a conversion system, illustrated in FIG. 2 and hereinafter described, which comprises the heart of the invention and is suitable for implementation in large-scale integrated circuit form. The apparatus illustrated in FIG. 1 includes a line interface unit 31 which is connected to the tip (T) and ring (R) terminals of a telephone line to receive a multifrequency signal generated when a button of a push-button telephone is depressed. The line interface unit couples the tip and ring lines to a dial tone filter 33. The dial tone filter may or may not be included in the overall apparatus, depending upon a variety of factors well known to those skilled in the art. When present, the dial tone filter prevents dial tone signals from being applied to the subsequent apparatus of the invention.

The output of the dial tone filter is connected to a high pass filter 35 and to a low pass filter 37. The high and low pass filters 35 and 37 separate received multifrequency signals into high and low frequency components. These components are separately applied through high and low frequency limiters 39 and 41 to the conversion system 43. In addition, a power detector 45 is connected to the output of the low pass filter. The power detector detects the occurrence of a low frequency component passed by the low pass filter and, thus, provides an indication that at least a low frequency component of a multifrequency signal has been received. This information is applied to the conversion system 43 for use as hereinafter described.

The conversion system 43 also receives an oscillator signal generated by an external oscillator 47. Further, an alternate symmetry detector 49 is connected to the output of the high frequency limiter and detects symmetry of that signal. If symmetry exists, the alternate symmetry signal applies a signal to the conversion system 43. The alternate symmetry detector may take on any one of several forms well known in the art or may be formed similarly to the internal symmetry counter and decoder hereinafter described.

The alternate symmetry detector is an alternate to the internal symmetry counter and decoder hereinafter described and is only incorporated in an actual embodiment of the invention if the internal symmetry counter and decoder is undesired or will not operate in the particular environment of use.

An output timing and control 51 is also illustrated in FIG. 1. As will be better understood from the following description, the output timing and control 51 is activated after the validity of a received multifrequency signal has been determined and provides a timing signal for gating the output from the conversion system to a plurality of digital output terminals, designated by a single output terminal 52 in FIG. 1.

From the foregoing description and viewing FIG. 1, it will be appreciated that the invention is directed to a multifrequency-to-digital conversion system wherein a two-tone multifrequency signal is received and separated into its high and low frequency components. The components are applied to a conversion system for conversion into a digital signal uniquely related to the frequency of the two tones making up the multifrequency signal. The conversion system is timed by an external oscillator and receives information (from the power detector) that a signal of adequate power has been received regardless of whether or not the signal is a valid signal. In addition, the output of the conversion system is timed by an output timing and control which is separate from the conversion system. Finally, and most importantly, the conversion system is suitable for implementation in large-scale integrated circuit form.

CONVERSION SYSTEM

Figure 2:
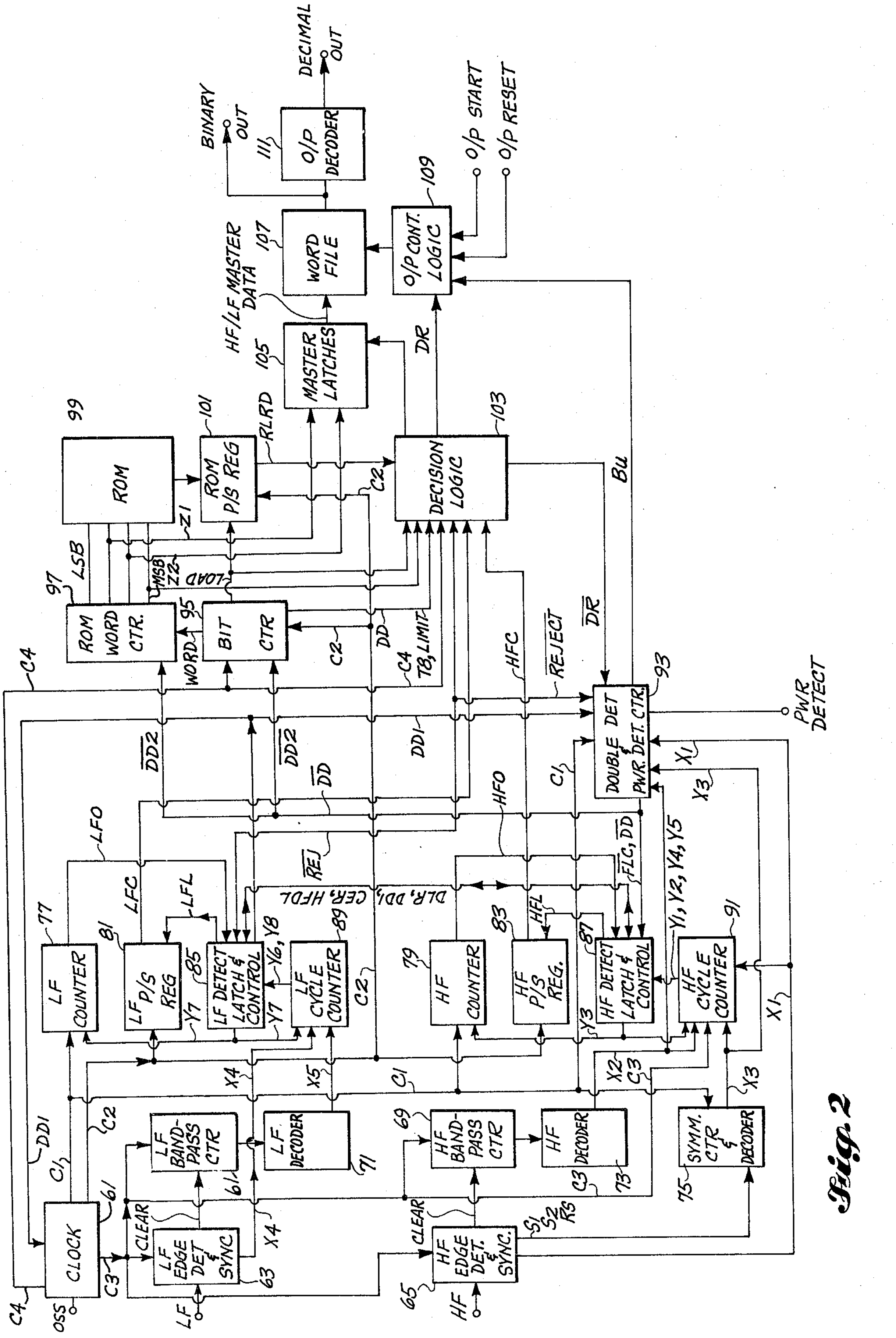
FIG. 2 is a block diagram of a preferred embodiment of the conversion system which forms a distinct part of the invention and is suitable for implementation in large-scale integrated circuitry form.

FIG. 2 is a block diagram illustrating a conversion system suitable for use by, and forming a part of, the invention. While illustrated in block form, as will be appreciated by those skilled in the art and others, the conversion system illustrated in FIG. 2 can be implemented in large-scale integrated form on a single monolithic chip.

The conversion system illustrated in FIG. 2 comprises: a clock 61; a low frequency edge detector and synchronizer 63; a high frequency edge detector and synchronizer 65; a low frequency bandpass counter 67; a high frequency bandpass counter 69; a low frequency decoder 71; a high frequency decoder 73; a symmetry counter and decoder 75; a low frequency counter 77; a high frequency counter 79; a low frequency parallel-to-series (P/S) register 81; a high frequency parallel-to-series (P/S) register 83; a low frequency detect latch and control 85; a high frequency detect latch and control 87; a low frequency cycle counter 89; a high frequency cycle counter 91; a double detector and power detector counter 93; a bit counter 95; a read-only memory (ROM) word counter 97; a read-only memory (ROM) 99; a read-only memory (ROM) parallel-to-series register 101; decision logic 103; master latches 105; a word file 107; output (O/P) control logic 109; and, an output decoder 111.

CLOCK

The clock 61 receives the oscillator pulses generated by the external oscillator 47 (FIG. 1) and provides a plurality of time related clock pulses used to gate the other subsystems of the invention connected thereto, in the manner hereinafter described. A logic diagram of a suitable clock is illustrated in FIG. 3 and comprises a clock counter 121 connected to receive the externally generated oscillator pulses (which may occur at a frequency of 353.0 KHz, for example). Preferably, the clock counter is a four-bit ripple counter. The clock illustrated in FIG. 3 also comprises five inverters designated I1–I5; and, three NAND gates designated G1–G3.

The most significant bit (MSB) output of the clock counter, through I1, forms a clock pulse chain designated C1. C1, as illustrated in FIG. 2, is applied to the low and high frequency counters 77 and 79, to the double detector and power detector counter 93, and to the symmetry counter and decoder 75. The least significant (LSB) output of the clock counter creates a clock pulse chain designated C3. C3, as illustrated in FIG. 2, is applied to the low and high frequency edge detectors and synchronizers 63 and 65, the low and high frequency bandpass counters 67 and 69, and the high frequency cycle counter 91.

In addition, the LSB output of the clock counter 121 is gated with the inverted input from the external oscillator to generate two non-overlapping clock pulses at one-half the external oscillator frequency. More specifically, the external oscillator input is applied through I2 to one input of G1. The LSB output of the clock counter 121 is connected to the second input of G1. The output of G1 is applied through I3 to one input of G2. The second input of G2 receives a signal designated DD1 (for digit detect). DD1 is generated in the manner hereinafter described. The output of G2, through I4, creates a clock pulse chain designated C2 having the characteristics described above (i.e., a clock pulse rate at one-half the oscillator frequency rate) and occurring whenever DD1 is in a one (as opposed to a zero) state. C2 is applied to the low and high frequency P/S registers 81 and 83, the bit counter 95, and the ROM P/S register 101.

In addition, the LSB output of the clock counter 121 is applied through I5 to one input of G3. The output of I2 is applied to the second input of G3. The output of G3 is an ungated pulse chain (as compared to C2, which is a gated pulse chain) designated C4 and having the characteristics described above, i.e., a clock pulse rate at one-half the oscillator frequency rate. C4 is applied to the bit counter 95 and to the decision logic 103 and is non-overlapping with respect to C2.

It should be noted at this point that the system herein described utilizes positive logic. However, the invention is equally suitable for implementation using negative logic as long as suitable system modifications are made, as will be understood by those skilled in the art.

EDGE DETECTOR AND SYNCHRONIZER

Figure 4:
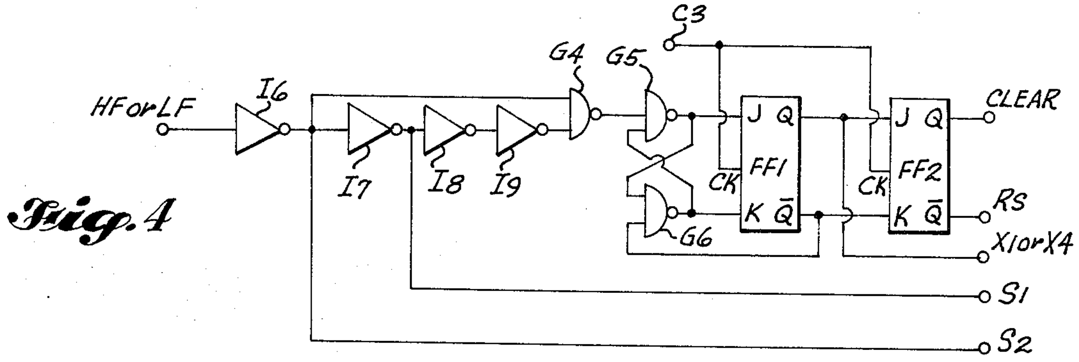
FIG. 4 is a logic diagram of an edge detector and synchronizing circuit suitable for use in the conversion system illustrated in FIG. 2.

The low frequency edge detector and synchronizer 63 and the high frequency edge detector and synchronizer 65 may be formed in a generally similar manner. FIG. 4 illustrates an edge detector and synchronizer suitable for either use and comprises four inverters designated I6, I7, I8 and I9; three two-input NAND gates designated G4, G5 and G6; and, two JK flip-flops designated FF1 and FF2. The high frequency or low frequency component, as the case may be, is connected through I6 to the input of a zero-to-one detector comprising I7, I8 and I9 and G4. More specifically, the output of I6 is connected through I7 in series with I8 and I9, in that order, to one input of G4. The output of I6 is also connected to the second input of G4. The zero-to-one detector detects the leading edge of each cycle of the incoming component of the multifrequency signal and generates a negative going spike each time the leading edge is detected. That is, the output of G4 is normally positive or one. When the leading edge of a cycle occurs, the output of G6 drops to a "zero" state and immediately returns to one, creating a negative going spike.

The output of I6 is designated S2 and the output of I7 is designated S1. S1 and S2 are applied to the symmetrical counter and decoder 75, hereinafter described. As will be appreciated from viewing FIG. 4, S1 is identical to the incoming component and S2 is the complement, or inverted form of the incoming component. As will be better understood from the following description, the symmetrical counter and decoder determines whether the high frequency component of the incoming signal is symmetrical. As previously indicated, and as will be understood from viewing FIG. 2, symmetry of the low frequency component is not determined. Hence, S1 and S2 are not created in the low frequency "channel" of the illustrated embodiment of the invention, even though they could be created and the low frequency component tested for symmetry, if desired.

The edge detector and synchronizer illustrated in FIG. 4 also includes an RS latch. The RS latch comprises G5 and G6 connected in a cross-coupled manner; that is, the outputs of G5 and G6 are cross-coupled each to one input of the opposite gate. The formation is such that when this latch is set, the output is G5 is in a one state (positive) and the output of G6 is in a zero state (negative with respect to the one state). When the RS latch is reset, the outputs of G5 and G6 are in the opposite states, i.e., G5 is in a zero state and G6 is in a one state. The RS latch is set or reset from its prior state, as the case may be, by a one-to-zero transition on the non-cross-coupled input.

The second input of G5 is connected to the output of G4. The J input of FF1 is connected to the output of G5 and the K input of FF1 is connected to the output of G6. The Q output of FF1 is connected to the J input of FF2. The Q output of FF1 also generates a signal designated X1 in the case of the high frequency channel, or X4 in the case of the low frequency channel. The $\overline{Q}$ output of FF1 is connected to the K input of FF2 and to the second input of G6. The Q output of FF2 generates a signal designated CLEAR and the $\overline{Q}$ output of FF2 generates a signal designated RS. The clock inputs of FF1 and FF2 receive C3 from the clock.

Prior to the detection of a leading edge of the associated high or low frequency component, the output of G4 is one. The output of G5 is a zero because of a previous one-to-zero transition of the $\overline{Q}$ output of FF1. Because a zero is on the J input of FF1, FF1 is in a reset state, i.e., its Q output is zero and its $\overline{Q}$ output is one. Moreover, FF2 is in a reset state because its I input is zero. Thus, the Q output of FF2 is zero and the $\overline{Q}$ output of FF2 is one. When a leading edge occurs, the negative spike on the output of G4 causes the output of G5 to become one, which action causes the output of G6 to become zero and "latch" G5 to a one output state. Thereafter, the next C3 pulse causes the output of FF1 to switch states. Thus, X1 changes from a zero state to a one state. In addition, the one-to-zero change in the $\overline{Q}$ output of FF1 causes the G5/G6 latch to reset, i.e., the output of G5 returns to zero. The outputs of FF2 remain in a reset state because the J input of FF2, when this C3 pulse occurred, was zero.

When next C3 pulse occurs, FF1 resets because the output of G5 is now zero. The second C3 pulse also causes the outputs of FF2 to switch states, because at this time, the J input of FF2 is one. Thus, the second C3 pulse which occurs after the occurrence of a leading edge causes: X1 to return to a zero state; the Q output of FF2 assumes its one state; and the $\overline{Q}$ output of FF2 to assume its zero state. The third C3 pulse causes the outputs of FF2 to return to their previous reset states, because at this point in time the Q output of FF1 is still a zero. Thus, after the third C3 pulse, X1 is zero, CLEAR is zero, and RS is one. These signals remain in these states until a second leading edge is detected by the zero-to-one detector and the output of G4 generates another negative going spike. As will be better understood from the following description, the CLEAR, RS and X1 signals control gating and counting by the circuits that receive these signals.

HIGH FREQUENCY BANDPASS COUNTER

Figure 5:
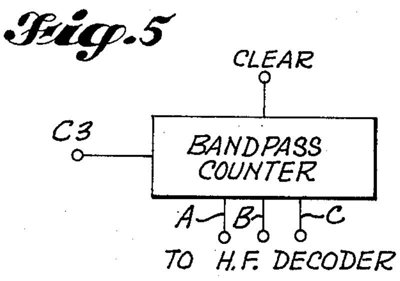
FIG. 5 is a logic diagram of a bandpass counter suitable for use in the conversion system illustrated in FIG. 2.

The high frequency bandpass counter is illustrated in FIG. 5 and comprises a binary bandpass counter that is adapted to count C3 pulses between the occurrences of CLEAR pulses (from FF2). That is, between the occurrence of CLEAR pulses, the bandpass counter counts C3 pulses. Certain stages of the bandpass counter, depending upon the bandwidth of interest, are connected to the high frequency decoder. When these stages are in predetermined states, the high frequency decoder output is in a one, rather than a zero, state. As will be better understood from the following description, if a strobe pulse, i.e., the Q output of FF1 (X1), goes to one while the output of the high frequency decoder is in a one state, the high frequency cycle counter receives a pulse. Because the high frequency bandpass counter/decoder combination only generates a one output during a time period related to the bandwidth of interest, i.e., the bandwidth determined by the range of acceptable high frequency components, the high frequency counter only counts pulses when the high frequency component falls within this time period.

HIGH FREQUENCY DECODER

Figure 7:
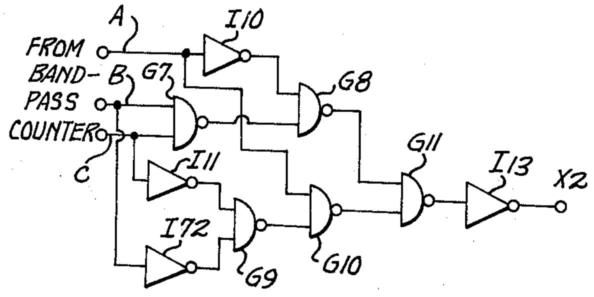
FIG. 7 is a logic diagram of a high frequency decoder suitable for use in the conversion system illustrated in FIG. 2.

FIG. 7 illustrates a high frequency decoder suitable for use by the invention in combination with a bandpass counter having the characteristics described above and comprises four inverters designated I10, I11, I12 and I13; and, five two-input NAND gates designated G7, G8, G9, G10 and G11. The outputs of three appropriate stages of the bandpass counter, designated A, B, and C are connected to the three illustrated inputs of the high frequency decoder. More specifically, the A output is connected through I10 to one input of G8 and to one input of G10. The B output is connected to one input of G7 and through I12 to one input of G9. The C output is connected to the second input of G7 and through G11 to the second input of G9. The output of G7 is connected to the second input of G8, and the output of G9 is connected to the second input of G10. The outputs of G8 and G10 are separately connected to the two inputs of G11. The output of G11 is connected through I13 to create an output signal designated X2. X2, as will be appreciated from viewing FIG. 2, is applied to the high frequency cycle counter 91 and to the double detector and power detector counter 93.

The high frequency decoder, as will be understood by those skilled in the art, decodes the inputs applied to it (A, B and C) in a manner such that X2 is either in a zero state or in a one state, depending upon the states of the inputs. There are eight different combinations of input states (000 through 111). Of these states, only two (011 and 100), which occur sequentially, cause X2 to be in a one state. All other combinations cause X2 to be in a zero state. Thus, these two states define the bandwidth of interest. If an X1 pulse does not occur when the inputs are in these states, the high frequency signal is outside of the band of interest and is rejected by the high frequency cycle counter, as will be better understood from the following description. Preferably, the high frequency signal lies between 1081 Hz and 1823 Hz, this being the normal high frequency range for a push-button telephone.

It will be appreciated by those skilled in the art and others that the high frequency bandpass counter counts in reverse. That is, since time is the inverse of frequency, X2 shifts to its one state when the upper end of the frequency range of interst starts and returns to its zero state when the lower end of the high frequency range is reached.

LOW FREQUENCY BANDPASS COUNTER

Figure 6:
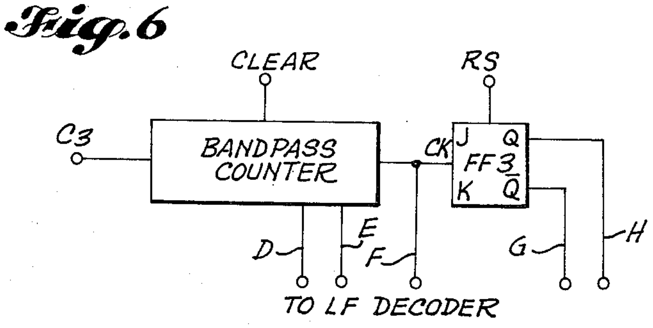
FIG. 6 is a logic diagram of a low frequency bandpass counter suitable for use in the conversion system illustrated in FIG. 2.

FIG. 6 illustrates a low frequency bandpass counter which, like the high frequency bandpass counter, counts C3 pulses and is controlled by the CLEAR pulses generated by FF2 of detector and synchronizing circuit. In addition to including a binary bandpass counter, the overall low frequency bandpass counter illustrated in FIG. 6 also includes a JK flip-flop designated FF3. The clock input of FF3 is connected to the output of the last stage of the bandpass counter. The JK inputs of FF3 are illustrated as being unconnected which means that a one is clocked into FF3 when a clock pulse occurs. FF3 is cleared (reset) by the RS output of FF2. FF3 is included so that the capacity of the overall low frequency bandpass counter is adequate to cover the range of low frequency components of interest—604 Hz to 1096 Hz for a push-button telephone—and may be eliminated if the bandpass counter chosen is adequate to cover this range. Thus, as with the high frequency bandpass counter, the low frequency bandpass counter is only one illustration of the type of counter arrangement that can be used by the invention, and the invention should not be construed as limited thereto.

LOW FREQUENCY DECODER

Figure 8:
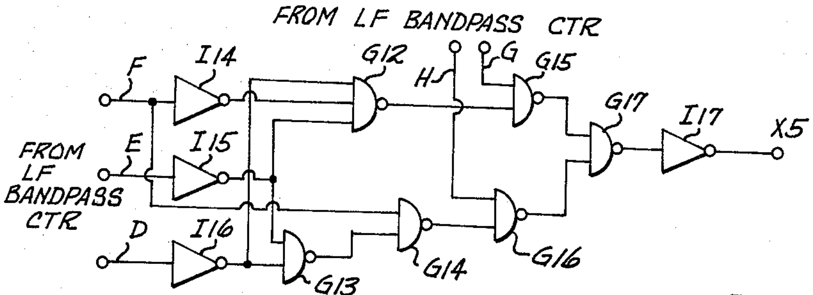
FIG. 8 is a logic diagram of a low frequency decoder suitable for use in the conversion system illustrated in FIG. 2.

FIG. 8 illustrates a low frequency decoder suitable for decoding the output of a low frequency bandpass counter of the type illustrated in FIG. 8 and comprises four inverters designated I14, I15, I16 and I17; one three-input NAND gate designated G12, and, five two-input NAND gates designated G13, G14, G15, G16 and G17. The outputs of the low frequency bandpass counter are designated D, E, F, G, and H, with G and H being, respectively, the $\overline{Q}$ and Q outputs of FF3. Output F is connected to one input of G14 and through I14 to one input of G12. Output E is connected through I15 to one input of G12 and one input of G13. Output D is connected through I16 to the other input of G13 and to the other input of G12. The $\overline{Q}$ output of FF3 (G) is connected to one input of G15. The other input of G15 is connected to the output of G12. The Q output of FF3 (H) is connected to one input of G16. The other input of G16 is connected to the output of G14. The outputs of G15 and G16 are connected to the inputs of G17. The output of G17, through I17, creates an output signal designated X5.

As with the high frequency decoder, the low frequency decoder has a one output (X5) whenever its inputs are in states such that the number of C3 pulses counted indicates that the low frequency component lies within the range of interest. Again, the output of the low frequency decoder shifts to its one state when the high end of the range is reached and returns to its zero state when the low end is reached. If, during this period of time an X4 pulse occurs (which occurrence corresponds to the occurrence of an X1 pulse on the high frequency situation discussed above), the low frequency cycle counter counts a pulse, which pulse indicates that the low frequency component is within the range of interest.

SYMMETRY COUNTER AND DECODER

Figure 9:
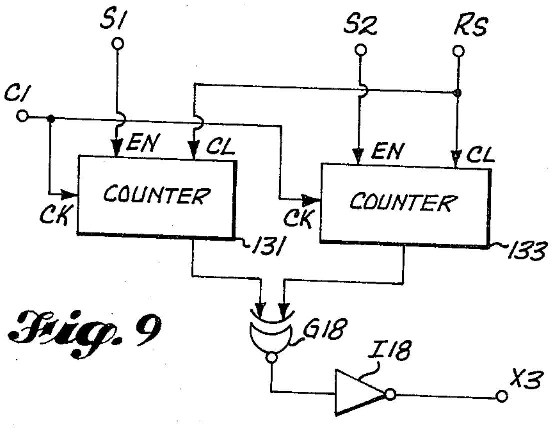
FIG. 9 is a logic diagram of a symmetry counter and decoder suitable for use in the conversion system illustrated in FIG. 2.

A symmetry counter and decoder circuit suitable for use by the invention is illustrated in FIG. 9 and comprises two symmetry counters 131 and 133, which are preferably 4-bit binary ripple counters; an exclusive OR gate designated G18; and, an inverter designated I18. C1 pulses are applied to the clock inputs of the high frequency edge detector and synchronizer 65 is connected to the clear inputs of both symmetry counters 131 and 133. One of the transitions (preferably the one-to-zero transition) of the RS output thus clears both counters at the same time—once each cycle of the high frequency component. Both symmetry counters have enable inputs, the status of which determines whether the counters count or are prevented from counting. S1 from the high frequency edge detector and synchronizer output is applied to the enable input of one symmetry counter 131 and S2 is applied to the enable input of the other symmetry counter 133. As will be appreciated by those skilled in the art and others, because S1 and S2 are obtained from opposite sides of I7, they are always in the opposite states, i.e., when S1 is in a one state, S2 is in a zero state and vice versa. Thus, one of the symmetry counters is gated "on" and counts during the positive portion of the high frequency component, and the other symmetry counter is gated on and counts during the negative portion of the high frequency component. It should be noted that the RS transition that resets both symmetry counters does not have to coincide with the start of a high frequency component cycle. Rather, it can occur at any point in the cycle as long as it occurs at the same point in each cycle. This manner of operation is assured by the high frequency edge detector and synchronizer illustrated in FIG. 4.

Once each complete cycle of the high frequency component, the most significant bit (MSB) outputs of the symmetry counters are gated to the high frequency cycle counter 91 in the manner hereinafter described. That is, once each cycle, the MSB outputs of the first and second symmetry counters 131 and 133 are "read" by G18. The output of G18 is connected to the input of I18, and the output of I18 is a signal designated X3. X3 is applied to the hereinafter described high frequency cycle counter. If both halves of the cycle are the same (i.e., the cycle is symmetrical), the output of G18 is in a zero state and the output of I18 is in a one state.

HIGH FREQUENCY CYCLE COUNTER

Figure 10:
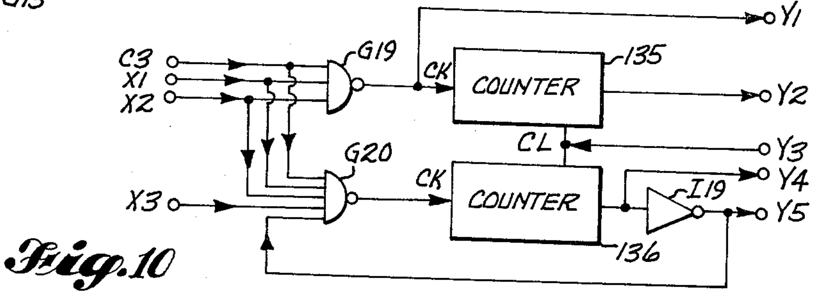
FIG. 10 is a logic diagram of a high frequency cycle counter suitable for use in the conversion system illustrated in FIG. 2.

FIG. 10 illustrates a high frequency counter 91 suitable for use by the invention and comprises: a three-input NAND gate designated G19; a five-input NAND gate designated G20; two cycle counters 135 and 136; and one inverter designated I19. Preferably the first cycle counter 135 is a nine bit shift register and the second cycle counter 137 is a seven bit shift register. The C3, X1 and X2 signals are applied to the three inputs of G19 and to three of the inputs of G20. G20 receives an X3 signal at its fourth input. The output of I19 is connected to the fifth input of G20. The output of I19 is an output signal designated Y5.

The output of G19 is an output signal designated Y1. Y1, in addition to being applied to the hereinafter described high frequency latch and control is also applied to the clock input of the first cycle counter 135. The output of the last stage of the first cycle counter 135 is output signal designated Y2. The output of G20 is connected to the clock input of the second cycle counter 136; and, the output of the last stage of the second cycle counter 136 is an output signal designated Y4. Y4, in addition to being applied to the high frequency detect latch and control is also applied to the input of I19. The clear inputs of the counters 135 and 136 receive a signal designated Y3 generated by the high frequency latch and control, as hereinafter described.

In operation, prior to receipt of a multifrequency signal, the outputs of G19 and G20 are both in a one state, because X1, X2 and X3 are all in zero states.

Upon receipt of a multifrequency signal, the bandwidth and symmetry "tests" described above occur. If the high frequency component falls within the frequency range of interest, X2 goes from its zero state to a one state. Immediately thereafter, at the start of the next high frequency cycle, X1 shifts from zero to one. The immediately following C3 pulse causes the output of G19 to shift from one to zero. That is, since C3, X1 and X2 are all in one states, and since G19 is an NAND gate, the output of G19 goes to zero. G19 stays at zero for one C3 pulse period. The one-to-zero transition of the output of G19, which occurs at the start of the C3 clock pulse, causes a latch forming part of the high frequency detect latch and control to cause Y3 to shift to a one state. This action clears both cycle counters 135 and 136 and allows them to count zero-to-one transitions, the first transition occurring when the same C3 clock pulse terminates. Thereafter, assuming that the high frequency component remains in the high frequency range of interest during a subsequent cycle, the first cycle counter 135 counts a pulse for each cycle. If, as indicated above, the first cycle counter 135 is a nine-bit shift register, after eight cycles or nine edges have been counted, Y2 shifts from a zero state to a one state. This signal is applied to the high frequency latch and control for use as hereinafter described.

In a generally similar manner, the output of G20 shifts from one to zero at the end of the first cycle of a valid high frequency component. The primary difference between the operation of G19 and G20 is that G20 requires that X3 be in a one state as well as X2 when X1 goes to a one state and the subsequent C3 pulse occurs. In other words, the high frequency component must by symmetrical as well as within the range of interest when the output of G20 goes through a one-to-zero transition and, then, back to a one state upon the occurrence of the C3 pulse. Moreover, the output of I19 must also be in a one state at this point in time. The output of I19 will be in a one state if the output of the second cycle counter is zero as it will be if a Y3 signal has occured to clear it. If such is the case, the zero-to-one transition occuring at the end of the C3 pulse will be counted by the second cycle counter 136. Thus, the first cycle counter 135 counts a pulse for each cycle that is within the frequency range of interest and the second cycle counter 136 counts a pulse for each cycle that is within the frequency range of interest and is symmetrical. After the second cycle counter is full (i.e., it has counted seven pulses), its output Y4 shifts from zero to one. This action causes the output of I19, Y5 to shift from one to zero. This shift prevents G20 from passing any subsequent C3 pulses to the second cycle counter 136.

HIGH FREQUENCY DETECT LATCH AND CONTROL

Figure 11:
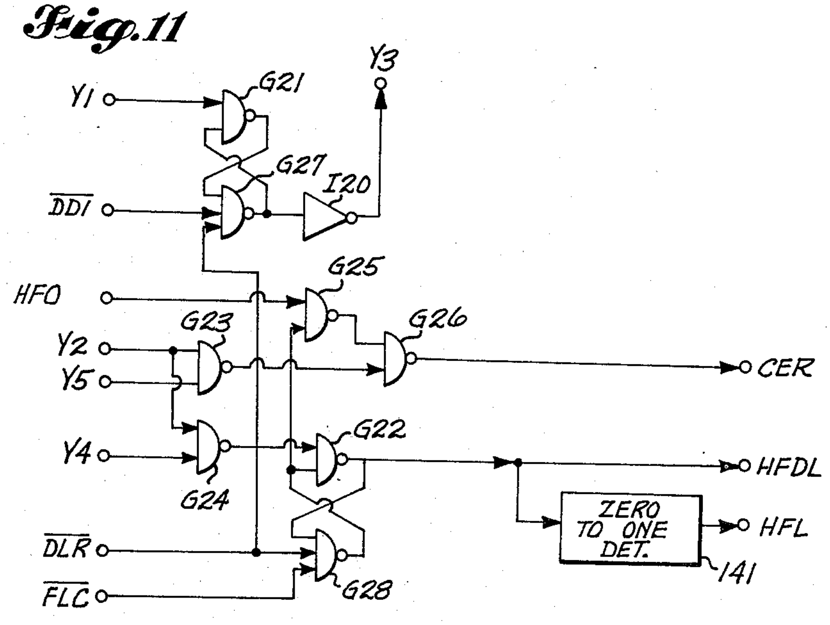
FIG. 11 is a logic diagram of a high frequency latch and control suitable for use in the conversion system illustrated FIG. 2.

FIG. 11 illustrates a high frequency detect latch and control suitable for use by the invention and comprises: six two-input NAND gates designated G21–G26; two three-input NAND gates designated G27 and G28; an inverter designated I20, and, a zero-to-one detector 141. G21 and G27 are cross-coupled to form a high frequency control latch. The other input of G21 receives the Y1 signal from the high frequency cycle counter illustrated in FIG. 10. One of the other two inputs of G27 receives a signal designated $\overline{DD1}$ is in a one state until the apparatus of the invention determines that both a "valid" high frequency component and a valid low frequency component have been received. At this point, as will be better understood from the following description, DD1 shifts from one to zero, causing the G21/G27 latch to reset and the test cycle to be repeated.

The third input to G27 is a signal designated $\overline{DLR}$ to represent the complement of detect latch release. As will be also better understood from the following description, $\overline{DLR}$ occurs when it is necessary to reset the entire system for one reason or another. More specifically, $\overline{DLR}$ is normally in a one state. When it is desired to reset the entire system, $\overline{DLR}$ goes from one to zero to reset the G21/G27 latch. The output of G27 is connected to the input of I20. The output of I20 is a signal designated Y3 and is applied to the high frequency cycle counters 135 and 136, as previously described.

The Y2 and Y4 signals occurring on the outputs of the first and second cycle counters 135 and 136, respectively, are applied to the two inputs to G24. G22 and G28 are cross-coupled to form a high frequency detect latch. The output of G24 is connected to the other input of G22. One of the other inputs of G28 receives the $\overline{DLR}$ signal. The third input of G28 is a signal designated $\overline{FLC}$ to represent frequency latch clear. $\overline{FLC}$ is normally in a one state and shifts from a one to a zero state to reset the G22/G28 latch in the manner hereinafter described. When the G22/G28 latch is set, in the manner hereinafter described, the output of G22 goes from zero to one. This signal is designated HFDL to represent high frequency digit load and is applied to the hereinafter described low frequency detect latch and control to indicate that a valid high frequency component has been detected. In addition, the output of G22 is applied to the input of the zero-to-one detector 141. The output of the zero-to-one detector is designated HFL to represent high frequency load and is applied to the high frequency parallel-to-series register 83. The pulse output of the zero-to-one detector, when it occurs, causes the high frequency parallel-to-series register to load in the count of the high frequency counter 79 at that point in time.

The Y2 and Y5 signals are applied to the two inputs of G23. The output of G23 is connected to one input of G26. The output of G28 is connected to one input of G25. The second input of G25 is a signal designated HFO to represent high frequency overflow. HFO is normally zero. However, if the high frequency counter counts pulses greater than its capacity, the HFO goes from a zero state to a one state. In other words, the high frequency counter has a maximum number of pulse which it can count. As long as this condition is not reached, HFO is zero. On the other hand, when this count level is surpassed, HFO shifts to a one state. The output of G25 is applied to the second input of G26. The output of G26 is a signal designated CER to represent clear registers and is applied to the low frequency detect latch and control 85.

Turning now to a description of the operation of the high frequency detect latch and control illustrated in FIG. 11, initially the G21/G27 latch is reset, as is the G22/G28 latch. These latches are reset by a $\overline{DLR}$ one-to-zero transition occurring at the end of a previous successful multifrequency signal detection or occuring in response to one of the other situations hereinafter described. In any event, when the output of G19 (FIG. 10) goes from one to zero to indicate that a high frequency component has been detected to be within the frequency band of interest, the G21/G27 latch sets. Prior to the G21/G27 latch setting, the output of G27 was in a one state making the output of I20 a zero. When the G21/G27 latch is set, the output of G27 goes to zero and the output of I20 goes to a one. The output of I20, thus, clears the first and second cycle counters and they start counting pulses which occur in the previously described manner. In addition, Y3 clears the high frequency counter 79 and it starts to count subsequent C1 pulses.

Assuming that all high frequency components lie within the frequency band of interest and are symmetrical, after seven cycles of the high frequency component occur, Y4 goes from zero to one. Two cycles later, Y2 goes from zero to one. These values (seven and nine) assume for purposes of discussion that the first high frequency cycle counter is a nine bit counter and that the second high frequency cycle counter is a seven bit counter. However, other count values can be used, as desired. In any event, when Y2 and Y4 both achieve a one status, the output of G24 goes through a one-to-zero transition and the G22/G28 latch is set. Setting the G22/G28 latch causes HFDL to go from a zero state to a one state. This signal is applied to the low frequency detect latch and control to inform it that the high frequency detect latch and control has been informed that a valid high frequency component has been detected and has successfully passed the symmetry and bandwidth tests for the required number of cycles. In addition, the zero-to-one detector 141 generates a pulse when the output of G22 went through its zero-to-one transition. This pulse causes the high frequency counter's count to be loaded into the high frequency parallel-to-series register.

The foregoing discussion assumes that an HFO signal did not occur prior to the G22/G28 latch being set. That is, if the high frequency counter overflows prior to the G22/G28 latch being set, HFO goes from zero to one. This shift indicates that the high frequency signal is below the range of interest because the C1 pulse rate combined with the capacity of the high frequency counter 79 determine the low end of the frequency range of the high frequency components of interest, i.e., if the high frequency component is too low, the high frequency counter overflows before G22/G28 is set. If HFO goes from zero to one before the G22/G28 latch is set, the output of G25 goes from one to zero. If at the same time, either Y2 and Y5 or both are in zero states (which condition indicates that neither of the high frequency cycle counters are full or that if one is full, the second is not), the output of G25 causes the output of G26 to go from zero to one. Thus, CER goes from zero to one, causing the generation of a $\overline{DLR}$ one-to-zero transition by the low frequency detect latch and control in the manner hereinafter described. The $\overline{DLR}$ one-to-zero transition resets both the G21/G27 latch and the G22/G28 latch. Resetting the G21/G27 latch clears both high frequency cycle counters 135 and 136 as well as the high frequency counter 79.

LOW FREQUENCY CYCLE COUNTER

Figure 12:
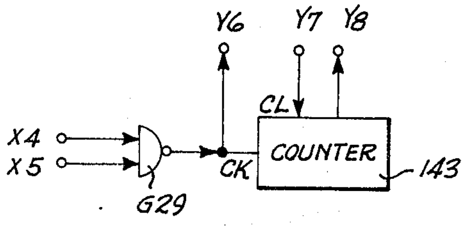
FIG. 12 is a logic diagram of a low frequency cycle counter suitable for use in the conversion system illustrated in FIG. 2.

FIG. 12 illustrates a low frequency cycle counter suitable for use by the invention and comprises a two-input NAND gate designated G29 and a counter 143. G29 receives the X4 and X5 signals generated by the low frequency edge detector and synchronizer and the low frequency decoder, respectively, in the manner previously described. As will be understood from the previous description, X4 is a strobe signal occurring on the Q output of FF1 of the low frequency edge detector and synchronizer. X5 is the output from the low frequency decoder and occurs when the low frequency component of the multifrequency signal is within the range of interest. Assuming that the low frequency component is witin the range of interest, the output of G29 shifts from one to zero upon the occurrence of a strobe (X4) pulse following the output of the low frequency decoder entering a one state. The output of G29 is designated Y6. The Y6 one-to-zero transition sets a latch in the low frequency detect latch and control illustrated in FIG. 13 and hereinafter described. That latch, when set, applies a signal designated Y7 to the cycle counter 143 which clears it. Thereafter, the cycle counter 143 counts subsequent zero-to-one transitions occurring on the output of G29 one each low frequency cycle. Thus, the cycle counter 143 first counts the transition that occurs when the first strobe pulse ends. Thereafter, each time a strobe pulse occurs and X5 indicates that the cycle related thereto falls within the low frequency range of interest, the cycle counter 143 counts up by one. Preferably, the cycle counter 131 is a nine bit shift register. The output of the last stage is a signal designated Y8 and is applied to the low frequency detect latch and control 85 and used as hereinafter described.

LOW FREQUENCY DETECT LATCH AND CONTROL

Figure 13:
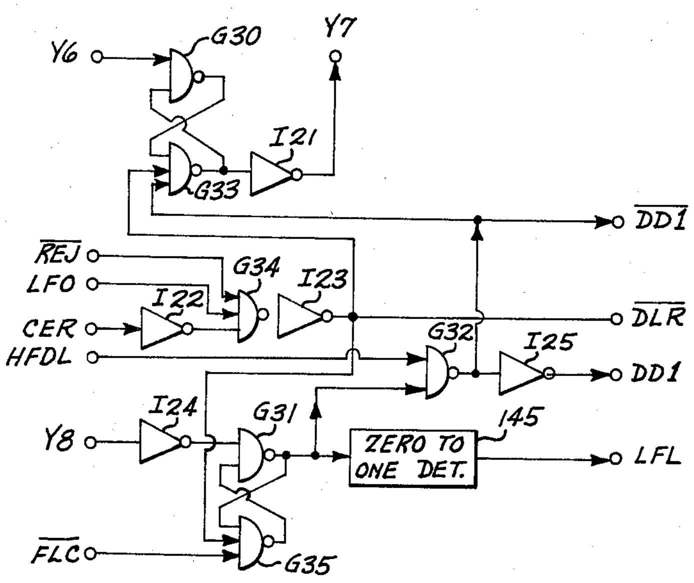
FIG. 13 is a logic diagram of a low frequency latch and control suitable for use in the conversion system illustrated in FIG. 2.

FIG. 13 illustrates a low frequency detect latch and control suitable for use by the invention and comprises three two-input NAND gates designated G30, G31 and G32; three three-input NAND gates designated G33, G34 and G35; five inverters designated I21-I25; and, a zero-to-one detector 145. G30 and G33 are cross-coupled to form a low frequency control latch. The other input of G30 is Y6 from the low frequency cycle counter illustrated in FIG. 12. As previously described, when an X4 strobe pulse occurs after X5 shifts to a one state, Y6 goes through a one-to-zero transition. This transition sets the G30/G33 latch and, as with I20, the output of I21 shifts from zero to one. This shift clears the cycle counter 143 and it counts subsequent strobe pulses. In addition, this shift allows the low frequency counter 77 (FIG. 2) to count subsequently occurring C1 clock pulses. The second input of G33 is connected to the output of I23, and the third input of G33 is connected to the output of G32. Either of these inputs to G33 reset the G30/G33 latch when they go through a one-to-zero transition.

The CER output of the high frequency detect latch and control (FIG. 11) is connected through I22 to one input G34. the second input to G34 is designated $\overline{\text{LFO}}$ to represent the complement of low frequency overflow. $\overline{\text{LFO}}$ is normally one. when the low frequency counter overflows, $\overline{\text{LFO}}$ shifts from one to zero. The third input to G34 is a signal designated $\overline{\text{REJ}}$. $\overline{\text{REJ}}$ is the complement of a reject signal (REJ) which is generated in the manner hereinafter described to cause the rejection of a normally valid multifrequency signal for subsequently discovered reasons. Thus, $\overline{\text{REJ}}$ is usually in a one state and shifts to zero when a subsequently discovered reason for rejection occurs. The output of G34 is connected to the input of I23. The output of I23, in addition to being connected to one of the inputs of G33, is also connected to an input of G35. The output of I23 is a signal designated $\overline{\text{DLR}}$ which, as previously described, is applied to the high frequency detect latch and control (FIG. 11). It will be appreciated that as long as all of the inputs to G34 are in one states, $\overline{\text{DLR}}$ is in a one state. When any of these inputs shift to a zero state, $\overline{\text{DLR}}$ shifts to a zero state.

G31 and G35 are cross-coupled to form a low frequency detect latch. The input of I24 receives the Y8 output of the counter 143. The output of I24 is connected to the other input of G31. Thus, the G31/G35 latch is set when the cycle counter 143 is full because when this occurs, the output of I24 goes through a one-to zero transition. The third input to G35 is the $\overline{\text{FLC}}$ signal briefly discussed above and generated as hereinafter described. The output of G31 is connected to the input of the zero-to-one detector 145. The output of the zero-to-one detector is designated LFL to represent low frequency load and is applied to the load input of the low frequency parallel-to-series register 81. An LFL pulse occurs when the G31/G35 latch is set. When an LFL pulse occurs, the low frequency parallel-to-serial register loads in the pulse count of the low frequency counter 77 existing at that period of time.

The output of G31 is also applied to one input of G32. The second input to G32 is the HFDL signal generated by the high frequency detect latch and control illustrated in FIG. 11. Thus, when the G31/G35 latch is set and the HFDL signal is in a one state (which occurs when the G22/G28 latch in the high frequency detect latch and control is set), the output of G32 shifts from one to zero. This output is designated $\overline{\text{DD1}}$ and, in addition to being applied to the G30/G31 latch is also applied to the G21/G27 latch of the high frequency detect latch and control as previously described. The one-to-zero transition of $\overline{\text{DD1}}$ resets both of these latches. Further, $\overline{\text{DD1}}$ is also applied to the input of I25. The output of I25 is designated DD1, the complement of $\overline{\text{DD1}}$, and is applied to the clock 61 (previously described) and to the double detector and power detector counter (FIG. 14, hereinafter described).

It will be appreciated from viewing FIG. 13 and the previous description that the low frequency detect and latch control, in addition to controlling cycle counter 143 and the low frequency control latches, G21/G27 and G30/G33. Further, as will be better understood from the following description, the $\overline{\text{DD1}}$ one-to-zero transition which occurs at the end of the first cycle of comparison counting causes $\overline{\text{FLC}}$ signal to go through a one-to-zero transition. This latter transition resets the high and low frequency detect latches, G22/G28 and G31/G35. Resetting of these four latches causes the system to recycle. Thus, after a first multifrequency signal has been detected and its components found to be within the frequency ranges of interest, the system repeats the tests to determine whether or not the multifrequency signal remains valid through a second sequence of operation. As will be better understood by the following description, the second sequence or cycle must be completed within a predetermined time period or the system is entirely reset.

DOUBLE DETECTOR AND POWER DETECTOR COUNTER

Figure 14:
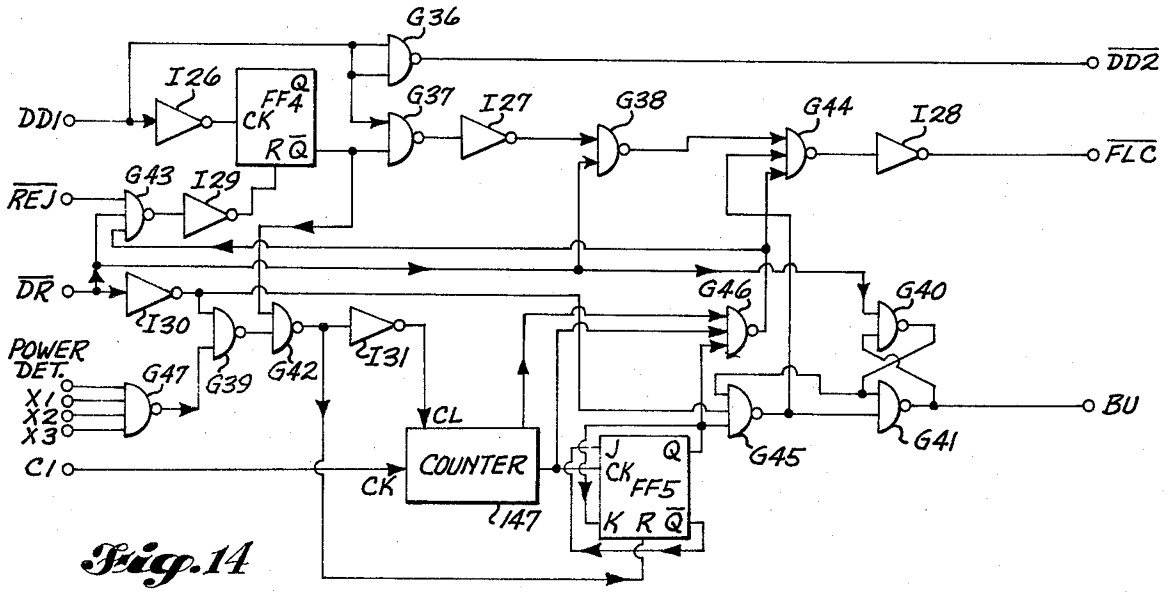
FIG. 14 is a logic diagram of a double detector and a power detector counter and suitable for use in the conversion system illustrated in FIG. 2.

FIG. 14 illustrates a double detector and power detector counter 93 suitable for use by the invention, and comprises a bistable JK flip-flop designated FF4; a divide-by-two JK flip-flop designated FF5; six inverters designated I26–I31; seven two-input NAND gates designated G36–G42; four three-input NAND gates designated G43–G46; one four-input NAND gate designated G47; and, a counter 147. DD1 from the low frequency detect latch and control illustrated in FIG. 13 is applied through I26 to the clock input of FF4. The JK inputs of FF4 are connected such that clocking FF4 causes the Q and $\overline{\text{Q}}$ outputs of FF4 to achieve set states.

DD1 also is applied to both inputs of G36. The output of G36 is designated $\overline{\text{DD2}}$ and is applied to the bit counter 95 (FIG. 15) and to the ROM word counter 97, as hereinafter described. DD1 is further applied to one input of G37. The $\overline{\text{Q}}$ output of FF4 is connected to the second input of G37. The output of G37 is connected through I27 to one input of G38. The output of G38 is connected to one input of G44. The output of G44 is connected to the input of I28. The output of G44 is the signal designated $\overline{\text{FLC}}$.

The $\overline{\text{REJ}}$ signal generated in the manner hereinafter described is applied to one input of G43. As previously indicated, $\overline{\text{REJ}}$ is normally in a one state. The second input of G43 is a signal designated $\overline{\text{DR}}$ to represent the complement of digit received (DR). Until the system has gone through two successful tests of the multifrequency signal, as will be understood from the following description, $\overline{\text{DR}}$ is in a one state. Thereafter $\overline{\text{DR}}$ is in a zero state until the system is reset. The output of G46 provides the third input to G43. As will be better understood from the following description, the output of G46 is in a one state until the counter 147 and FF5 are in predetermined states. The output of G43 is applied through I29 to the reset input of FF4. Since, initially, all three inputs to G43 are ones, its output is a zero, making the output of I29 a one. The initial shift of I29 to a zero state resets FF4.

$\overline{\text{DR}}$ is applied to the second input of G38. The output of G46 is applied to the second input of G44, and the output of G45 is applied to the third input of G44.

$\overline{\text{DR}}$ is also applied through I30 to one input of G39 and to one input of G45. The second input to G39 is the output of G47. G47 receives four inputs. Three of these inputs are the X1, X2 and X3 signals generated in the manner previously described. The fourth input is received from the power detector 45 (FIG. 1) and provides, when in a one state, information that a multifrequency signal, regardless of its true validity, is being received. When this condition ends, the power detector signal drops to a zero state. The output of G39 is applied to one input of G42. The second input of G42 is the $\overline{Q}$ output of FF4. The output of G42 is connected through I31 to the clear input of the counter 147. The output of G42 is also connected to the reset input of FF5.

G46 receives one input from the most significiant bit (MSB) output of the counter 147 and a second input from an intermediate stage of the counter 147. The third input to G46 is the Q output of FF5. The clock input of FF5 is the MSB output of the counter 147. As previously indicated, FF5 is a divide-by-two flip-flop. Thus, the Q output of FF5 is connected to the K input of FF5 and the $\overline{Q}$ output is connected to the J input of FF5. The output of FF5 is further connected to the second input of G45.

G40 and G41 are cross-coupled to form a buttons-up (BU) latch. The output of G40 is also applied to a third input of G45. The output of G45 is applied to the other input of G41. $\overline{DR}$ is applied to the other input of G40. The output of G41 is a signal designated BU. BU is applied, for reasons hereinafter described, to the output control logic circuit 109.

Initially, FF4 is reset by one of the inputs to G43 achieving a zero state, causing the output of I29 to achieve a zero. As previously described, the successful detection and analysis of the high and low frequency components causes DD1 to shift from a zero state to a one state. When this occurs, $\overline{DD2}$ shifts from a one state to a zero state. As will be understood from the following description, this first shift of $\overline{DD2}$ from a zero to a one state is rather short and, thus, has essentially no effect on the bit counter. Because when DD1 shifts from zero to one the $\overline{Q}$ output of FF4 is in a one state, the output of G37 shifts from a one state to a zero state. This shift is inverted by I27. Since at this point in time, $\overline{DR}$ is in a one state, the output of G38 goes from a one state to a zero state. Since at this point the outputs of G46 and G45 are in one states (because one or more of their inputs are in zero states), the shift in the output of G38 causes the output of G44 to shift from a zero state to a one state. This latter shift is inverted by I28. Thus, $\overline{FLC}$ shifts from a one state to a zero state. This latter shift or transition resets the high and low frequency detect latches, G22/G28 and G31/G35. As described above, the other two latches, G21/G27 and G30/G33, of the high and low frequency detect latch and controls, were reset when $\overline{DD1}$ shifted from one to zero. Thus, at this point, all four latches of these sections are reset and the received multifrequency signal is retested for validity. It should be noted that when $\overline{FLC}$ shifted from one to zero, DD1 and $\overline{DD1}$ immediately reversed their previous states. The shift of DD1 to a zero state clocks FF4, causing the Q and $\overline{Q}$ outputs of FF4 to switch states, resulting in the termination of the zero state of $\overline{FLC}$, i.e., $\overline{FLC}$ returns to its one state. Thus, $\overline{FLC}$ zero only exists for a short period of time.

When the Q and $\overline{Q}$ outputs of FF4 shift states, the output of G42 also changes states because the output of G39 is in a one state ($\overline{DR}$ is in a one state, causing the output of I30 to be in a zero state). The change in state of the output of G42 from zero to one resets FF5; thus, the Q output of FF5 shifts to a zero state and the $\overline{Q}$ output shifts to a one state, if not previously in those states. Because the Q output of FF5 is zero, the outputs of G45 and G46 remain in one states.

The counter 147 at this point is enabled to count C1 clock pulses, because the output of I31 drops to a zero state. After a predetermined number of pulses have been counted, the counter applies a clock pulse to FF5, causing its outputs to switch states. Thereafter, the counter 147 counts some additional pulses until its two outputs connected to G46 both achieve one states. When this occurs, the output of G46 shifts from a one state to a zero state. This shift passes through G43 and I29, resulting in FF4 being rest. This overall action creates a time delay of, for example, 20 milliseconds. If the second DD1 zero-to-one transition does not occur prior to the end of this time delay, it acts the same as the first DD1 zero-to-one transition and resets the latches of the high and low frequency detect latches and controls. Resetting of FF4 causes the counter 147 to be cleared and inhibited from counting C1 pulses. Clearing the counter causes the output of G46 to return to a one state, and thus, G44 is conditioned to pass the second DD1 zero-to-one transition and create the $\overline{FLC}$ one-to-zero transition which resets the four latches.

The foregoing description describes the situation which occurs if the multifrequency signal does not prove to be valid during the time delay period. On the other hand, if the multifrequency signal proves to be valid during this period, as it should if it truly is a valid signal, the second DD1 zero-to-one transition occurs prior to the end of the delay period. When this situation occurs, $\overline{DD2}$ shifts from one to zero and remains there until $\overline{DR}$ goes from one to zero to reset FF4. As hereinafter described, $\overline{DR}$ goes from one to zero after the pulse count in the high and low parallel-to-series registers are analyzed and found to compare with stored pulse chains related to predetermined frequency values. This comparison also occurs within the time period determined by the counter 147 and FF5.

When $\overline{DR}$ goes from one to zero, it sets the G40/G41 latch, causing BU to achieve a zero state. Shortly thereafter, prior to the counter 147 being cleared and FF5 being reset, BU achieves a one state because all of the inputs of G45 achieve one states, i.e., the output of G40, the Q output of FF5 and the output of I30. A time delay may be included between I30 and G39 to insure that BU shifts to a one state before FF5 is reset, if necessary. As will be better understood, BU is a gating signal that gates DR to a zero-to-one detector, forming part of the output control logic.

BIT COUNTER

Figure 15:
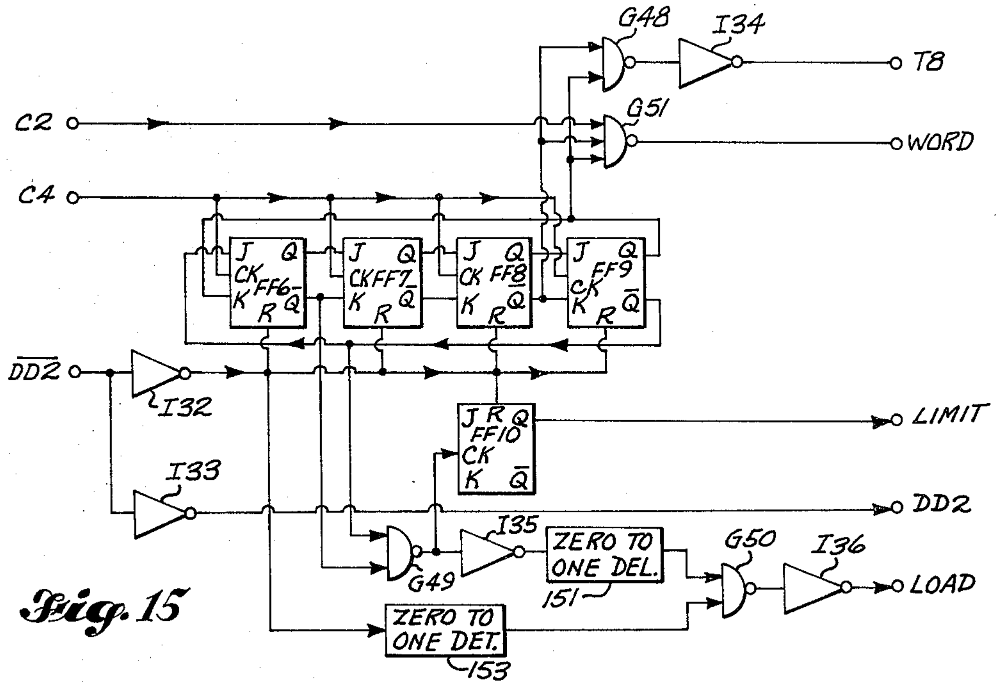
FIG. 15 is a logic diagram of a bit counter suitable for use in the conversion system illustrated in FIG. 2.
Figure 16:
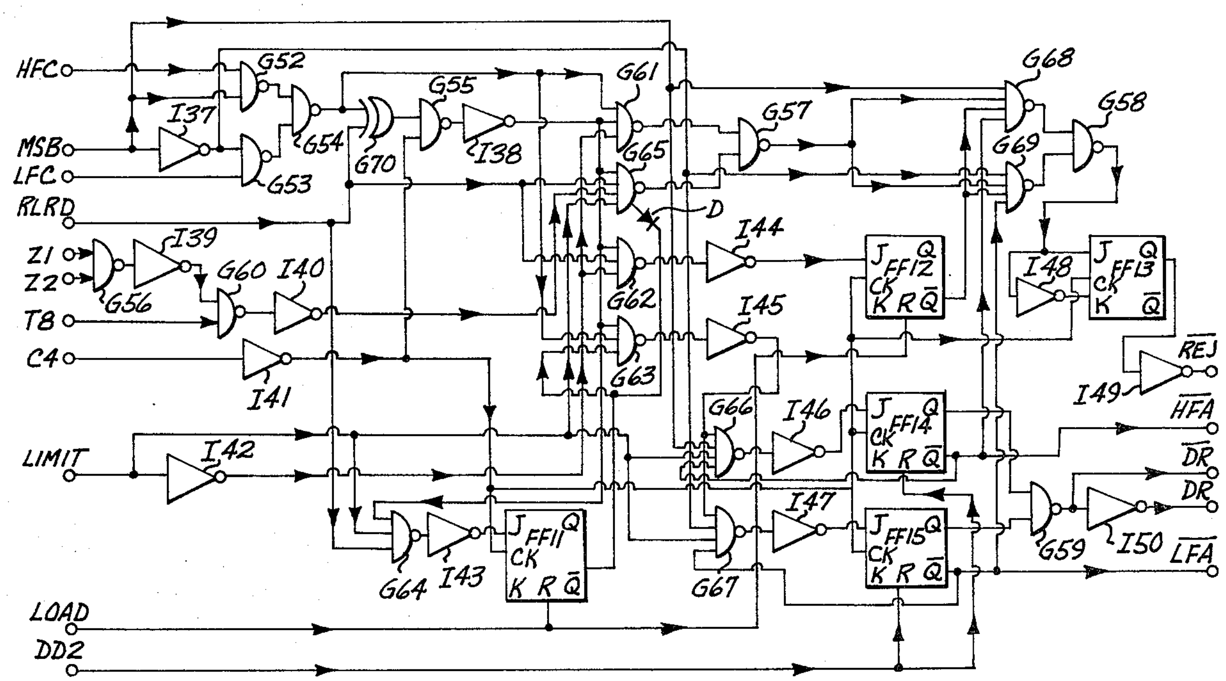
FIG. 16 is a logic diagram of a decision logic circuit suitable for use in the conversion system illustrated in FIG. 2.

FIG. 15 illustrates a bit counter suitable for use by the invention and comprises four flip-flops designated FF6–FF10; three two-input NAND gates designated G48–G50; one three-input NAND gate designated G51; five inverters designated I32–I36; and, two zero-to-one detectors 151 and 153. FF6, FF7, FF8 and FF9 are serially connected as a four-stage Johnson counter with the $\overline{Q}$ output of FF9 connected to the J input of FF6 and the Q output of FF9 connected to the K input of FF6. The Q and $\overline{Q}$ outputs of the other stages are connected to the J and K inputs of their adjacent stages, respectively. The clock inputs of FF6 through FF9 are connected to receive C4 clock pulses from the clock source. The $\overline{DD2}$ output of the double detector and power detector counter (FIG. 14) is applied through I32 to the reset inputs of FF6 through FF9. In addition, the output of I32 is applied to the reset input of FF10 and to the input of one of the zero-to-one detectors 153. $\overline{DD2}$ is also applied to the input of I33. The output of I33 is a signal designated DD2 to represent the complement of $\overline{DD2}$ and is applied to the decision logic (FIG. 16).

The $\overline{Q}$ output of FF8 is connected to one input of G48 and one input of G51. The output of FF9 is connected to the second input of G48 and to a second input of G51. G51 also receives C2 clock pulses. These clock pulses, as will be appreciated from viewing FIG. 3 and the previous description only occur after DD1 goes from zero to one and remains there. The output of G48 is applied to the input of I34. The output of I34 is a signal designated T8. The output of G51 is a signal designated WORD. T8 is applied to the decision logic 103 and $\overline{WORD}$ is applied to the ROM word counter 97. The $\overline{Q}$ output of FF6 and the $\overline{Q}$ output of FF9 are applied to the two inputs of G49. The output of G49 is applied to the clock input of FF10 and through I35 to the input of the other zero-to-one detector 151. The outputs of the zero-to-one detectors 151 and 153 are separately applied to the two inputs of G50. The output of G50 is applied to the input of I36. The output of I36 is a signal designated LOAD and is applied to the decision logic. The Q output of FF10 is a signal designated LIMIT and is applied to the decision logic also.

In operation, when $\overline{DD2}$ shifts from one to zero at the time DD 1 shifts from zero to one for the second time, the output of I32 shifts from zero to one resetting FF6 through FF9, and resetting FF10. Thereafter, the one on the $\overline{Q}$ output of FF9 is shifted through FF6–FF9 as C4 pulses occur.

When the output of I32 shifts from zero to one, this transition is sensed by zero-to-one detector 153 and a positive going pulse occurs on the output of I36. After this pulse, the output if I36 returns to its normal zero state. This initial LOAD pulse resets accept and inhibit flip-flops (FF1 and FF12) of the hereinafter described decision logic. It also loads a first ROM pulse chain into the ROM P/S register 101 for comparison purposes, as hereinafter described.

The first C4 pulse applied to the clock inputs of FF6 through FF9 causes the output of G49 to shift from its previous zero state (created when FF6-FF9 were cleared) to a one state. This shift clocks FF10 so that LIMIT achieves a one state. This signal is applied to certain NAND gates of the hereinafter described decision logic. FF10 remains in this set state until FF6–FF9 have counted eight C4 pulses in total, at which time they have completed a complete cycle of counting. The ninth pulse resets FF10 and it remains in that state until another cycle of counting is completed. Just prior to FF10 being reset by the output of G49, the output of G49 goes through a one-to-zero transition. This transition is inverted by I35. This inversion creates a zero-to-one transition which is sensed by G50 and causes a second LOAD pulse to occur. This LOAD pulse clears again the accept and reject flip-flops of the decision logic. In addition, it loads a second pulse chain from the ROM 99 into the ROM P/S register 101 for comparison purposes.

What pulse chain of the ROM 99 is applied to the ROM P/S register 101 is controlled by the ROM word counter 97. Specifically, when $\overline{DD2}$ goes from one to zero and stays there after the second analysis or test of the multifrequency signal, the ROM word counter is gated on and set to an initial word output on lines LSB, Z1, Z2 and MSB (FIG. 2). Thereafter, each time the seventh pulse occurs in the sequence of C4 pulses applied to FF6–FF9, ones are applied to two inputs of G51 to the two inputs of G48. The output of G48 immediately goes through a one-to-zero transition and remains there for a C4 pulse period. Due to the inclusion of I34, T8 goes from zero to one when this occurs to provide a low limit check, as hereinafter described. The output of G51, when the next C2 pulse occurs, shifts from one to zero for the C2 pulse period. This shift applies a WORD pulse to the ROM word counter 97, causing it to change its output states. This change sets up the ROM 99 for the next pulse chain to be loaded into the ROM P/S register 101. As previously described, this loading occurs during the following C4 pulse period when both inputs to G49 simultaneously achieve a one state. Thus, the ROM word counter is incremented one pulse period prior to the ROM pulse chain being loaded into the ROM P/S register. This time period is provided in order for the ROM word counter to ripple down prior to loading.

DECISION LOGIC

Decision logic suitable for use by the invention is illustrated in FIG. 16 and comprises five JK flip-flops designated FF11 through FF15; fourteen inverters designated I37–I57; one diode designated D; nine two-input NAND gates designated G52–G60; four three-input NAND gates designated G61–G64; five four-input NAND gates designated G65–G69; and, one Exclusive OR gate designated G70. The pulse chain output of the high frequency parallel-to-series register 83 is designated HFC and is applied to one input of G52. The most significant bit (MSB) output of the ROM word counter 97 is applied to the second input of G52. Thus, when the MSB output of the ROM word counter is in a one state, the high frequency counter pulse chain passes through G52. The output of G52 is applied to one input of G54.

The MSB output of the ROM word counter is also applied through I37 to one input of G53. The pulse chain output of the low frequency parallel-to-series register 81 is designated LFC and is applied to the second input of G53. Because the state of the output of I37 is the opposite of its input state, when the MSB output is zero, G53 is gated on and passes the LFC pulse chain. The output of G53 is applied to the other input of G54. Thus, the G54 receives either HFC or LFC pulse chains, depending upon the state of the MSB output of the ROM word counter. The output of G54 is applied to one input of the Exclusive OR gate, G70. The output of the ROM P/S register 101 is designated RLRD to represent read-only memory limit register data and is applied to the second input of G70. Because the ROM P/S register and both the low and high frequency parallel-to-series registers 81 and 83 are all clocked by C2 pulses, the pulse chains applied to G70 are automatically compared by G70 as they are applied.

The output of G70 is applied to one input of G55. C4 clock pulses are applied to the second input of G55 through I41. Thus, the G70 output is clocked through G55 by C4 clock pulses. The output of G55 is connected through I38 to one of the inputs of G61, G62, G63, G64 and G65. The output of G54 is also applied to a second input of G61. The LIMIT signal from the bit counter (FIG. 15) is applied through I42 to the third input of G61.

G65, in addition to receiving a signal from I38, also receives the RLRD pulse chain. Further, G65 receives the Z1 or Z2 signals gated by T8. More specifically, Z1 and Z2 represent the two intermediate significant bits occurring between the lowest significant bit (LSB) and the most significant bit (MSB) of the outputs of the ROM word counter 97. These signals are applied to the two inputs of G56. The output of G56 is applied through I39 to one input of G60. T8 is applied to the second input of G60. Thus, if Z1 and Z2 are both in one states when T8 goes to one, the output of G60 becomes zero. This output is inverted by I40 and applied to G65. The fourth input to G65 is the LIMIT signal. The outputs of G61 and G65 are applied to the inputs of G57.

G62, in addition to receiving the output of I38, also receives RLRD and the output of I42, the complement of LIMIT. The output of G62 is inverted by I44 and applied to the J input of FF12. FF12 is a reject inhibit flip-flop which inhibits the reject flip-flop (FF13) when it is set, as will be better understood from the following description.

G63, in addition to receiving the output of I38, also receives the output of G54 and the $\overline{Q}$ output of FF11, as controlled by D. FF11 is an accept inhibit flip-flop which is cleared by the LOAD pulses generated by the bit counter as heretofore described. C4 clock pulses are applied to the clock input of FF11 after being inverted by I41.

G64 receives RLRD, LIMIT and I38 signals on its three inputs. The output of G64 is applied through I43 to the J input of FF11. The output of G63 is applied through I45 to one of the inputs of each of G66 and G67. LIMIT is applied to one of the other inputs of each of G66 and G67. The $\overline{Q}$ output of FF14, the high frequency accept flip-flop, is applied to the third input of G66. The $\overline{Q}$ output of FF15, the low frequency accept flip-flop, is applied to the third input of G67. The MSB output of the ROM word counter is applied to the fourth input of G66, and the output of I37 ($\overline{\text{MSB}}$) is applied to the fourth input of G67. The output of G66 is applied through I46 to the J input of FF14, and the output of G67 is applied to the J input of FF15 through I47. The output of I41 ($\overline{\text{C4}}$) is applied to the clock inputs of FF14 and FF15. FF14 and FF15 are reset by DD2. The $\overline{Q}$ output of FF14 is designated $\overline{\text{HFA}}$ to represent the complement of high frequency accept and is applied to one input of G68. The $\overline{Q}$ output of FF15 is designated $\overline{\text{LFA}}$ to represent the complement of low frequency accept and is applied to one input of G69. The Q outputs of FF14 and FF15 are connected to the two inputs of G59. The output of G59 is designated $\overline{\text{DR}}$ to represent the complement of digit received and is applied to the input of I50. Thus, the output of I50 is designated DR to represent digit received. DR and $\overline{\text{DR}}$ are used in the manner heretofore described.

The output of G57 is applied to one input of each of G68 and G69. The MSB output of the ROM word counter is applied to a third input of G68, and the output of I37 ($\overline{\text{MSB}}$) is applied to the third input of G69. The $\overline{Q}$ output of FF12, the reject inhibit flip-flop, is applied to the fourth inputs of each of G68 and G69. The outputs of G68 and G69 are applied to the two inputs of G58. The output of G58 is applied to the J input of FF13 and through I48 to the K input of FF13. FF12 and FF13 are clocked by $\overline{\text{C4}}$ (the output of I41). The Q output of FF13 is applied to the input of I49. The output of I49 is designated $\overline{\text{REJ}}$ to designate the complement of reject. $\overline{\text{REJ}}$, as will be understood from the previous description, is applied to the low frequency detect latch and control, and to the double detector and power detector.

Turning now to a descripion of the operation of the decision logic, the Exclusive OR gate, G70, is a comparator. When both inputs to G70 are the same (i.e., both zeros or both ones), the output is a zero. On the other hand, when both inputs are different, the output is a one. Comparisons are performed on a most significant bit first basis and proceed toward a least significant bit comparison, starting with the lowest frequency or highest binary count.

Assuming initially that LIMIT is in a zero state and that the MSB output of the ROM word counter is in a zero state, LFC is first compared with RLRD. If RLRD is greater than LFC, at some points in the comparison, the output of I38 will reach a one state. At the same time, RLRD will be in a one state (because it is greater than LFC). When this occurs, the output of G64 shifts from one to zero. This shift is inverted by I43 and clocked into FF11 by a $\overline{\text{C4}}$ pulse occurring before this condition ends. Thus, the accept inhibit flip-flop, FF11, is set. Setting FF11 prevents FF14 and FF15 from being set, even though this action is redundant for this sequence of operation because LIMIT is zero. If, on the other hand, LFC should prove to be greater than RLRD (meaning it is lower in frequency than the lowest frequency), the output of G61 goes from one to zero. This shift passes through G57, G69 and G58, causing a one to be generated at the Q output of FF13. Through I49, this one causes $\overline{\text{REJ}}$ to shift to zero, causing resetting of latches in the low and high frequency detect latches and controls, as previously described.

Assuming that the reject flip-flop, FF13, is not set, the bit counter (FIG. 15) pulses the ROM word counter in the manner previously described and the cycle repeats. However, LIMIT is now one rather than zero, because FF10 has been clocked once in the manner previously described. If at some point in this comparison RLRD is again shown to be greater than LFC, FF11 is again set and inhibits the operation of FF14 and FF15. This condition, RLRD being greater than LFC, does not activate FF13 because the zero output of I42 inhibits G61.

It will be appreciated at this point that the first comparison was a reject comparison wherein the reject gates and flip-flops were in a test condition and the second comparison was an accept comparison, wherein the accept gates and flip-flops were in a test condition. This alternate reject/accept sequence continues until either a low frequency accept is found or the top end of the low frequency range is reached. A low frequency accept condition occurs when there is a lack of comparison, LIMIT is one, the accept inhibit flip-flop, FF11, is not set and LFC is found to be greater than RLRD. When this occurs, FF15 is set.

When the top end of the low frequency range is reached, the two intermediate bits, Z1 and Z2, simultaneously achieve one states. During the T8 pulse period, the I40 input to G65 is one. If during what would normally be the accept portion of this reject/accept sequency, which is the last such sequence, RLRD is determined to be greater than LFC, indicating that LFC is higher than the test range, the output of G65 shifts from one to zero. This shift passes through G57, G69 and G58, causing FF13 to be set. Setting FF13 causes $\overline{REJ}$ to go through a one-to-zero transition. This transition, as described above, resets the latches of the low and high frequency detect latches and controls.

Assuming a low frequency comparison has been found and FF15 is set before the end of the range is reached (preventing G69 from setting FF13), the MSB output of the ROM word counter changes to a one state. Now G52 passes HFC pulses rather than G53 passing LFC pulses and the decision logic performs exactly the same reject/accept sequence of tests on the HFC pulse chain. If the HFC pulse chain proves to be outside of the test range, FF13 is set. If the HFC pulse chain proves to be within the test range, at some point FF14 is set.

When FF15 is set, $\overline{LFA}$ shifts from one to zero. When FF14 is set, $\overline{HFA}$ shifts from one to zero. When both $\overline{HFA}$ and $\overline{LFA}$ have shifted to zero, $\overline{DR}$ shifts to zero and DR shifts to one to indicate that a valid digit has been received and successfully passed all of its tests. The $\overline{HFA}$ and $\overline{LFA}$ signals are applied to the master latches 105 (FIG. 2), hereinafter described. DR is applied to the output control logic 109; and, $\overline{DR}$ is applied to the double detector and power detector counter 93. The one-to-zero shift in $\overline{DR}$, which occurs when $\overline{HFA}$ and $\overline{LFA}$ shift from one to zero, resets FF4. Resetting of FF4 causes $\overline{FLC}$ to return to one. This action resets all of the latches of the low and high detect latches and controls so that the front end of the system is ready to analyze subsequent multifrequency tones.

In conclusion, it will be appreciated from the foregoing description that the decision logic consists of a reject flip-flop (FF13), high and low accept flip-flops (FF14 and FF15) and reject and accept inhibit flip-flops (FF12 and FF11). It will also be appreciated that all comparisons between the outputs of the ROM P/S register and the high and low frequency P/S registers are done on a most significant bit first basis, starting with the lowest frequency or highest binary count. A decision to reject the frequency is always made on the first, third, etc., upper count limits. Accept decisions are always made on the second, fourth, etc., lower count limits. Initially, the reject flip-flop was not set. The reject inhibit flip-flop sets the first time that the limit is larger than the unknown, i.e., the output from the ROM R/S register is larger than the output from the associated low or high frequency P/S register. It resets at the end of the word. The accept flip-flops set the first time the unknown is greater than the limit, if the accept inhibit flip-flop was not previously set. The accept inhibit flip-flop is set the first time the limit is greater than the unknown. Anytime during the comparison cycle that the reject flip-flop sets, the front end sections are reset and a new test cycle is started. As will be understood from the following description, anytime an accept flip-flop is set, the two middle bits of the ROM word counter are stored in master latches. When high and low frequency master latches are set, the DR signal that is simultaneously generated allows the latch inputs to be shifted to the outputs where they are decoded into binary form, also as hereinafter described.

MASTER LATCHES

Figure 17:
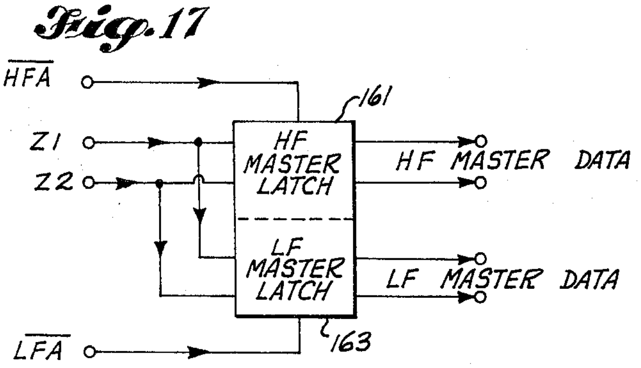
FIG. 17 is a logic diagram of master latches suitable for use in the conversion system illustrated in FIG. 2.

FIG. 17 illustrates master latches suitable for use by the invention and comprises a high frequency master latch 161 and a low frequency master latch 163. Both master latches have two inputs connected to receive the Z1 and $\overline{Z2}$ signals generated by the ROM word counter 97. $\overline{LFA}$ is applied to the control input of the low frequency master latch 163 and $\overline{HFA}$ is applied to the control input of the high frequency master latch 161. When $\overline{LFA}$ shifts from one to zero, indicating the acceptance of a low frequency component, the Z1 and Z2 signals existing at that instant in time are applied to and stored by the low frequency master latch 163. These signals are, thus, available for later use as hereinafter described. Similarly, when the $\overline{HFA}$ shifts from one to zero, as previously described, the high frequency master latch 163 receives and stores the Z1 and Z2 signals existing at that instant in time. It should be noted that a standard push-button telephone has the ability to generate combinations of four high frequency components and four low frequency components. Since there are four possible Z1/Z2 state combinations, these combinations are adequate to identify all four low and high frequency components.

OUTPUT CONTROL LOGIC

Figure 18:
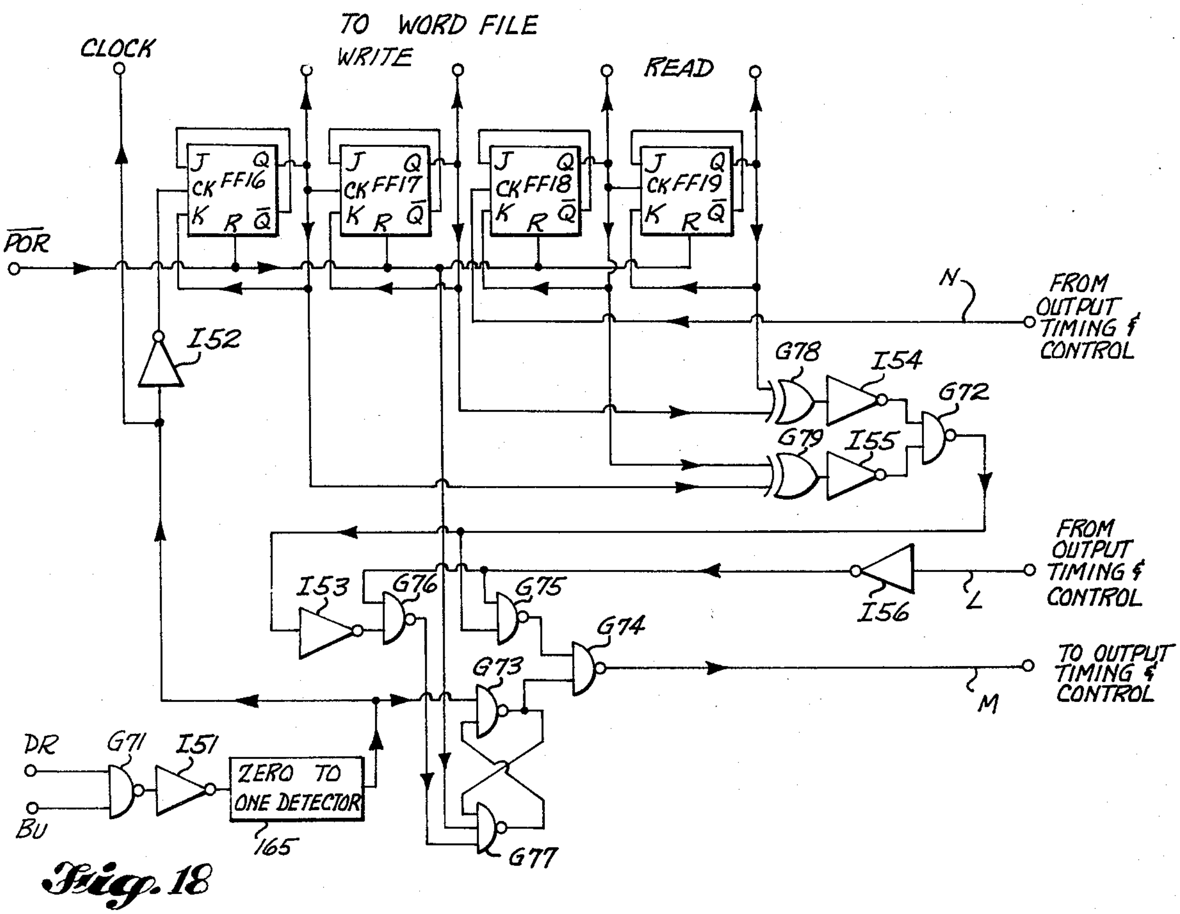
FIG. 18 is a logic diagram of an output control logic circuit for use in the conversion system illustrated in FIG. 2.

FIG. 18 illustrates output control logic suitable for use by the invention and comprises four JK flip-flops designated FF16 through FF19; six inverters designated I51 through I56; six two-input NAND gates designated G71 through G76; one three-input NAND gate designated G77; two Exclusive OR gates designated G78 and G79; and, a zero-to-one detector 165.

Figure 19:
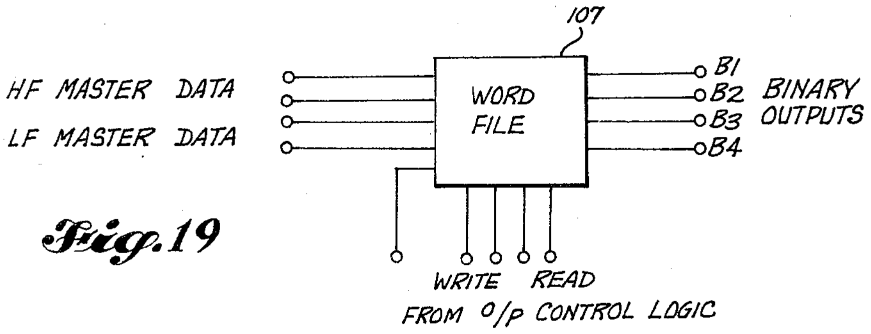
FIG. 19 is a logic diagram of a word file suitable for use in the conversion system illustrated in FIG. 2.

A signal designated $\overline{POR}$ is applied to the reset inputs of FF16-FF19. $\overline{POR}$ is an initial reset signal that shifts from a zero-to-one state when power is applied to the system. FF16 and FF17 are connected in divide-by-two modes with the Q output of FF16 being connected to the clock input of FF17. The Q outputs of FF16 and FF17 are connected to the write inputs of the word file 107. The states of the outputs of FF16 and FF17 determine the location, in the word file, that a particular set of high and low frequency master data signals are to be stored. The high and low frequency master data signals are the outputs of the high and and low frequency master latches, as illustrated in FIGS. 17 and 19.

Similarly, FF18 and FF19 are connected in divide-by-two modes with the Q output of FF18 being connected to the clock input of FF19. FF18 is clocked by a signal (N) generated by the hereinafter described output timing and control. The Q outputs of FF18 and FF19 determine the location (and thus the identity) of the particular high and low frequency master data signals that are read out of the word file when readout occurs in the manner hereinafter described. The readout signals are binary signals (as were the Z1 and Z2 signals stored in and received from the master latch) and identified as B1, B2, B3 and B4 in FIG. 19.

The BU signal is applied to one input of G71. As previously indicated, BU shifts from zero to one after DR shifts from zero to one. DR is applied to the second input of G71. The output of G71 shifts from one to zero as BU shifts from zero to one. This shift is inverted by I51 and applied to the zero-to-one detector creating a pulse. This clock pulse is applied to the control input of the word file, causing it to read the outputs of the master latch and store the high and low frequency master data in the location in the word file determined by the output states of FF16 and FF17.

The output of the zero-to-one detector is also applied through I52 to the clock input of FF16. Thus, just after the time word file "reads" the output of the master latch, the output of FF16 changes states. The outputs of FF17 may or may not change states, depending upon its previous status of the outputs of FF16, as will be understood by those skilled in the art. A slight time delay is created by I52, causing a zero-to-one transition to be applied to the word file before a zero-to-one transition is applied to FF16 and FF17.

G73 and G77 are cross-coupled to form an output latch. $\overline{POR}$ is applied to the second input of G77 and resets the output latch when a received multifrequency signal terminates because $\overline{POR}$ goes through a one-to-zero transition when this occurs. The output of the zero-to-one detector is applied to the second input of G73 to provide a set signal each time the zero-to-one detector generates a pulse.

Exclusive OR gates G78 and G79 sense whether or not the statuses of FF16 and FF18, and FF17 and FF19, respectively, are the same. In this regard, the Q outputs of FF16 and FF18 are applied to the inputs of G79, and the Q outputs of FF17 and FF19 are applied to the inputs of G78. When the inputs to either G78 or G79 are not the same, their outputs shift from zero to one. These shifts are inverted by I54 and I55, as the case may be, causing the output of G72, to which these shifts are applied, to shift from zero to one. This shift is applied to one input of G75 and through I53 to one input of G76. An output (L) of the output timing and control illustrated in FIG. 21 and hereinafter described is applied through I56 to the other inputs of G75 and G76. The output of G75 is applied to the one input of G74 and the output of G73 is applied to the second input of G74. The output of G76 is applied to the third input of G77. The output of the zero-to-one detector 165 is applied to the other input of G73. The output (M) of G73 is applied to the output timing and control hereinafter described.

In operation, as previously indicated, when DR and BU achieve one states, the zero-to-one detector 165 generates a pulse. This pulse sets the G73/G77 latch, clocks the word file and, subsequently upon its fall (return to one) clocks FF16. When the outputs of one or the other, or both, of FF16 and FF17 change states, the output of G72 goes from zero to one. At this point in time, the input to I56 is zero. Thus, the output of I56 is one. Hence, the zero-to-one shift in the output of G72 applies a one-to-zero shift in the output of G75, causing a zero-to-one shift in the output of G74. That is, when the G73/G77 latch was initially set, the output of G73 went from a zero state to a one state. This shift caused the output of G74 to go from one to zero. When the output of G72 goes from zero to one, as previously described, the output of G75 goes from one to zero, causing the output of G74 to return to a one state. The zero-to-one change in the output of G72 does not reset the G73/G77 latch through G76, since the output of G76 goes through a zero-to-one transition, not a one-to-zero transition—this occurs later, as hereinafter described.

WORD FILE

As indicated above, FIG. 19 illustrates a word file suitable for use by the invention. The word file 107 receives the high frequency and low frequency master data from the high frequency and low frequency master latches, and is controlled by the control, write and read signals generated by the output control logic (FIG. 18). The outputs of the word file are four binary signals related to the high and low frequency master data. The four binary outputs of the word file are applied to an output decoder, preferably of the type illustrated in FIG. 20.

OUTPUT DECODER

Figure 20:
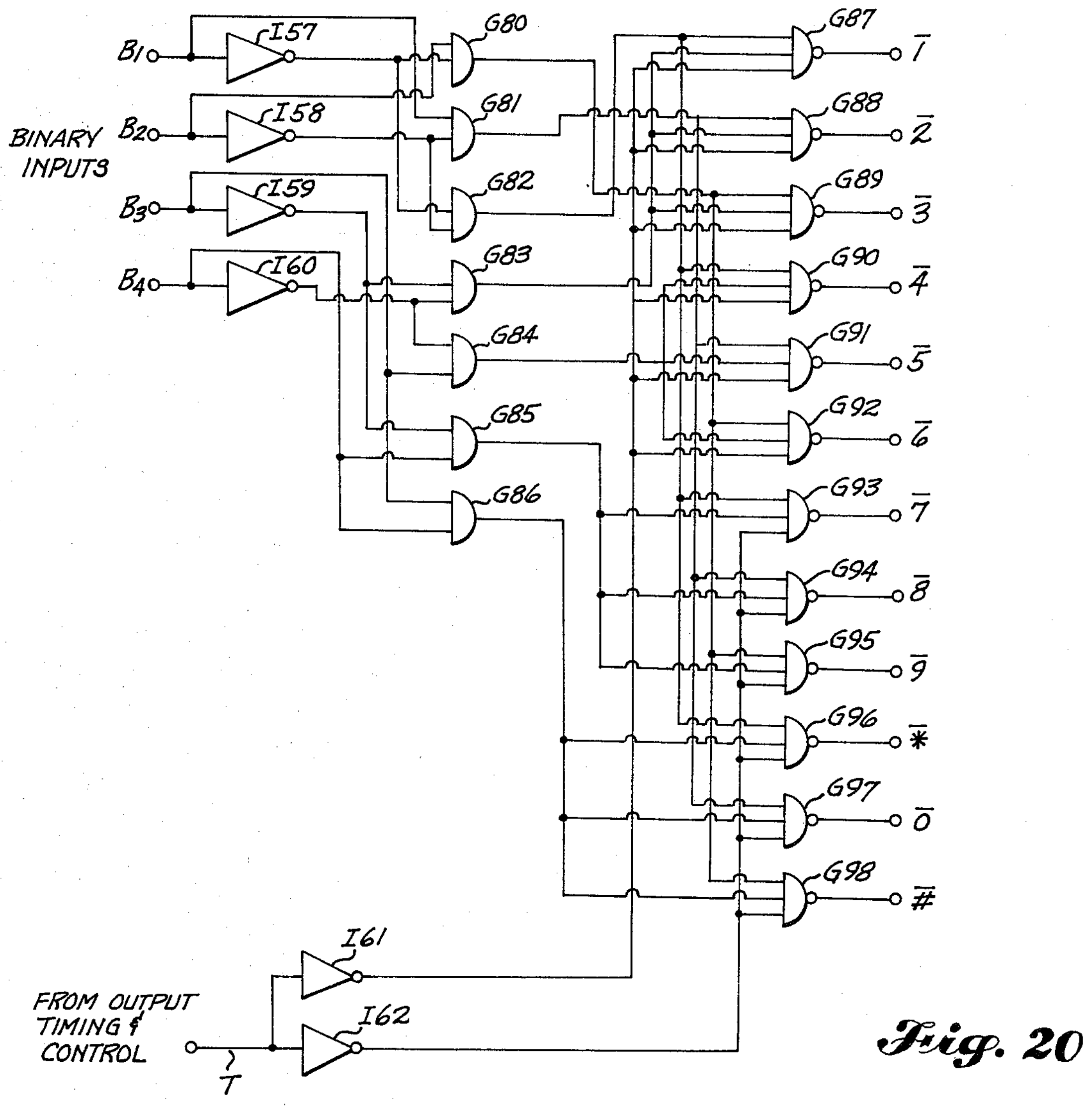
FIG. 20 is a logic diagram of an output decoding circuit suitable for use in the conversion system illustrated in FIG. 2; and, FIG. 21 is a schematic diagram of an output timing and control circuit suitable for use in the embodiment of the invention illustrated in FIG. 1.

An output decode suitable for use by the invention is illustrated in FIG. 20 and comprises six inverters designated I57 through I62; seven AND gates designated G80 through G86; and, twelve NAND gates designated G87 through G98. The B1 output of the word file is applied to one input of G81 and through I57 to one input each of G80 and G82. The B2 output of the word file is applied to one input of G80 and through I58 to one input of G81 and one input of G82. The B3 output is applied to one input of G84 and to one input of G86, and through I59 to one input of G83 and to one input of G85. The B4 output of the word file is applied to one input of G85 and to one input of G86, and through I60 to one input of G83 and to one input of G84.

A timing signal (T) from the output timing and control (FIG. 21), generated in the manner hereinafter described, is applied through I61 to one input each of G87, G88, G89, G90 and G91. The same output from the timing and control is also applied through I62 to one input each of G93, G94, G95, G96, G97 and G98. The output of G80 is applied to one input each of G89, G92, G95, and G98. The output of G81 is applied to one input each of G88, G91, G94 and G97. The output of G82 is applied to one input each of G87, G90, G93 and G96. The output of G83 is applied to one input each of G87, G88, and G89. The output of G84 is applied to one input each of G90, G91 and G92. The output of G85 is applied to one input each of G93, G94 and G95. The output of G86 is applied to one input each of G96, G97 and G98.

The output of G87 is applied to an output terminal designated $\overline{1}$. The output of G82 is applied to an output terminal designated $\overline{2}$. The output of G89 is applied to an output terminal designated $\overline{3}$. The output of G90 is applied to an output terminal designated $\overline{4}$, and the output of G91 is applied to an output terminal designated $\overline{5}$. The output of G92 is applied to an output terminal designated $\overline{6}$. The output of G93 is applied to an output terminal designated $\overline{7}$, and the output terminal of G94 is applied to an output terminal designated $\overline{8}$. The output of G95 is applied to an output terminal designated $\overline{9}$, and the output of G96 is applied to an output terminal designated $\overline{*}$. The output of G97 is applied to an output terminal designated $\overline{O}$, and the output of G98 is applied to an output terminal $\overline{\#}$.

In operation, the output decoding circuit illustrated in FIG. 20 interprets the outputs of the word file and, in accordance therewith, one of the output terminals carries a signal that shifts from one to zero, all the remaining terminals remaining in one states. For example, if the outputs of the word file are all zeros, the output of G87 shifts to zero providing a 1 indication. As the outputs from the word files (B1–B4) change states, the outputs on the output terminals correspondingly change states. Thus, the outputs of G87 through G98 are digital representations of the detected and analyzed multifrequency signal.

OUTPUT TIMING AND CONTROL CIRCUIT

Figure 21:
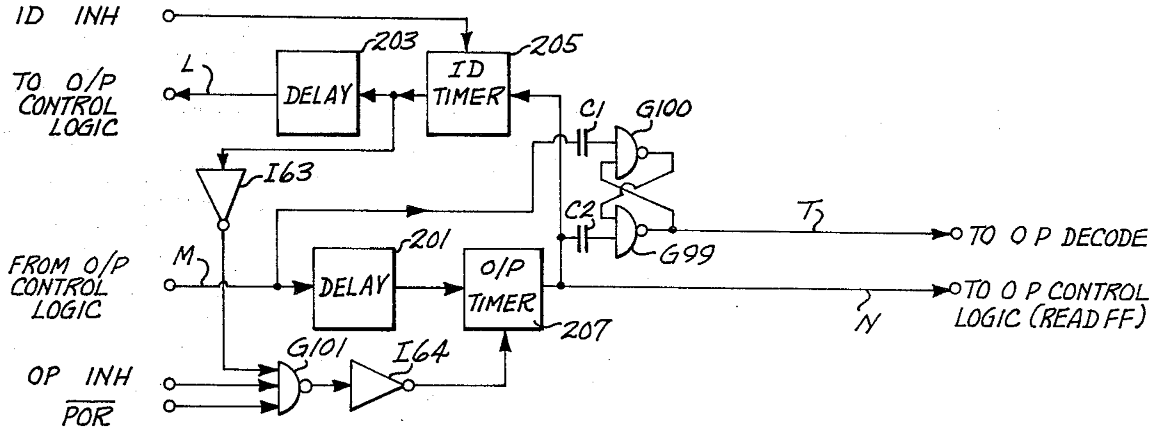

FIG. 21 illustrates an output timing and control circuit suitable for use by the invention. As described above, this circuit is external to the monolithic conversion system illustrated in FIG. 2 and previously described. The output timing and control circuit illustrated in FIG. 21 comprises first and second delays 201 and 203; an interdigit (ID) timer 205; an output (O/P) timer 207; two inverters designated I63 and I64; two two-input NAND gates designated G99 and G100; one three-input NAND gate designated G101; and, two capacitors designated C1 and C2. The output timing and control circuit illustrated in FIG. 21 receives three external signals. One signal is an interdigit inhibit signal (ID INH) which is connected to an inhibit input of the ID timer 205. This signal is generated by suitable external apparatus (not shown) when it is desired to inhibit the apparatus of the invention by preventing interdigital time-out from occurring. The second signal is an output inhibit signal (O/P INH) and is applied to one input of G101. This signal is also generated by suitable external apparatus (not shown) when it is desired to inhibit the O/P timer 207. The third signal is the $\overline{POR}$ previously discussed and is applied to a second input of G101.

The output (M) of G74 of the output control logic (FIG. 16) is applied to the input of the first delay 201 and, through C1, to an input of G100. G99 and G100 are cross-coupled and form an output decode latch. The output of the first delay 201 is applied to the input of the O/P timer. The output (N) of the O/P timer is applied to the read flip-flops (FF18 and FF19) of the output control logic and to the input of the ID timer 205.

The output of the O/P timer is also applied, through C2, to the other input of G99. The output (T) of G99 is applied to the inputs of I61 and I62 of the output decoder (FIG. 20).

The output from the ID timer 205 is applied through the second delay 203 to the input of I56 of the output control logic (signal L). The output of the ID timer is also applied through I63 to the third input of G101. The output of G101 is applied through I64 to the inhibit input of the O/P timer 207.

In operation, assuming that ID INH, O/P INH and $\overline{POR}$ signals are all in one states, and the output of the second ID timer 205 is in a one state, as is normal when a signal is received, when a DR zero-to-one transitoin occurs, in the manner previously described, the G73/G77 latch of the output control logic circuit is set, causing a one-to-zero transition to be applied to the input of the first delay 201 and to the reset input of the G99/G100 latch, through C1. The output of G99 thus shifts from one to zero, after a slight delay created by C1, and a one is applied by I61 and I62 to G87–G98. Thus, the decoder is conditioned to decode its B1–B4 inputs. As previously indicated, the output of G74 returns to zero after G78, G79 or both sense an unbalance on their respective inputs. After a slight delay created by the first delay 201, the O/P timer starts to operate and shifts its output from a zero state to a one state. This shift clocks FF18, bringing the outputs of FF18 and FF19 to the same states as the outputs of FF16 and FF17, assuming that FF16 and FF17 haven't been clocked again in the meantime, which will not normally occur in the time frame of operation of the invention. This coincidence resets the G73/G77 latch. If coincidence does not occur, the G73/G77 latch is not reset. After a predetermined period of time, the O/P timer output returns to zero. This action, after a slight delay created by C2, resets the G99/G100 latch and ends decoding. At the same time, the ID timer is started. After a slight delay, the output of the second delay 203 causes the output of I56 to shift from one to zero. This action has no effect on the G73/G77 latch, because the output of G76 shifts from zero to one. After a predetermined time period, the output of the second delay returns to zero. This action will reset the G73/G77 latch, if it had been set in the intervening interval. If such a situation did occur, and it is not likely, the O/P timer would not have recognized the setting of the G73/G77 latch until the end of the ID timer period, because it was inhibited by the output of the ID timer during this period by the output of I63 being in a zero state.

It will be appreciated from the foregoing description that the invention provides an apparatus suitable for implementation in monolithic form to create a frequency-to-digital converter for converter multifrequency (dual tone) push-button telephone signals into d.c. signals suitable for use by rotary dial systems. While this is the prefered use of the invention, and it was developed for this use, as will be appreciated by those skilled in the art and others, it can also be used in other environments. The invention includes a number of guarding means adapted to prevent erroneous operation. Yet, even with these guarding means, the system remains suitable for implementation in monolithic form. Hence, in addition to being reliable in operation, the invention is inexpensive to manufacture.

While a preferred embodiment of the invention has been illustrated and described, it will be appreciated by those skilled in the art and others that various changes can be made therein without departing from the spirit and scope of the invention. For example, while the invention has been illustrated as using positive logic and formed primarily of NAND gates, it can also use negative or other types of logic and formed of other suitable types of gates; for example, NOR gates can be utilized. Hence, the invention can be practiced otherwise than as specifically described herein.

The embodiments of the invention in which an exclusive property or privilege is claimed are defined as follows:

1. A multifrequency-to-digital converter comprising:
   1. receiving means for receiving a multifrequency signal including at least two components having different frequencies;
   2. separating means connected to said receiving means for separating said received multifrequency signal into said at least two components having different frequencies; and
   3. conversion means connected to said separating means for converting said at least two components into a digital signal representing said at least two components, said conversion means comprising:
      a. bandpass means connected to said separating means for determining whether said at least two components are within predetermined frequency ranges;
      b. detecting means connected to said bandpass means for detecting when said bandpass means has determined that said two components are within said predetermined frequency ranges;
      c. counting means adapted to receive pulses and connected to said detecting means for counting pulses over a predetermined number of cycles of said at least two components, said counting starting when said bandpass means determins that said components are within said predetermined frequency ranges; and, d. decoding means connected to said counting means for decoding the number of pulses counted by said counting means over said predetermined number of cycles and, in accordance therewith, generating a digital signal related to said received multifrequency signal, said decoding means including memory means for storing a plurality of different pulse counts; and, comparing means for sequentially comparing the pulse counts stored by said memory means with the pulse counts counted by said counting means and for generating an output signal when a comparison, within a predetermined range is found.

2. A multifrequency-to-digital converter as claimed in claim 1 wherein one of said at least two components is a high frequency component and wherein the other of said two components is a low frequency component.

3. A multifrequency-to-digital converter as claimed in claim 2 wherein said bandpass means comprises:

a low frequency bandpass counter connected to receive said low frequency component and generate a digital output related to the frequency of said low frequency components;

a low frequency decoder connected to said low frequency bandpass counter for decoding the digital output of said low frequency bandpass counter and generating a signal related to whether or not said low frequency component is within a predetermined low frequency range;

a high frequency bandpass counter connected to receive said high frequency component and generate a digital output related to the frequency of said high frequency component; and, a high frequency decoder connected to said high frequency bandpass counter for decoding the digital output of said high frequency bandpass counter and generating a signal related to whether or not said high frequency component is within a predetermined high frequency range.

4. A multifrequency-to-digital converter as claimed in claim 3 including a symmetry counter and decoder connected to receive one of said high and low frequency components and determine whether or not said one of said high and low frequency components is symmetrical and generate a signal related to whether or not said one of said high and low frequency components is symmetrical.

5. A multifrequency-to-digital converter as claimed in claim 4 wherein said counting means comprises:

low frequency counting means adapted to count clock pulses and generate a serial output signal related to the number of clock pulses counted over a predetermined number of cycles of said low frequency components;

a low frequency cycle counter connected to said low frequency decoder for counting the number of cycles determined by said low frequency decoder to be within said predetermined low frequency range;

a low frequency detect latch and control connected to said low frequency cycle counter and to said low frequency counting means for sensing when said low frequency cycle counter receives a signal from the low frequency decoder indicating that at least one cycle of the low frequency component has fallen within said predetermined low frequency range and causing said low frequency counting means to start counting pulses, and for determining when said low frequency cycle counter determines that a predetermined number of cycles have fallen within said predetermined low frequency range and stopping said low frequency counter means from counting pulses;

high frequency counting means adapted to count clock pulses and generate a serial output signal related to the number of clock pulses counted over a predetermined number of cycles of said high frequency component;

a high frequency cycle counter connected to said high frequency decoder for counting the number of cycles determined by said high frequency decoder to be within said predetermined high frequency range; and, a high frequency detect latch and control connected to said high frequency cycle counter and to said high frequency counting means for sensing when said high frequency cycle counter receives a signal from said high frequency decoder indicating that at least one cycle of said high frequency component has fallen within said predetermined high frequency range and causing said high frequency counting means to start counting pulses, and for determining when said high frequency cycle counter determines that a predetermined number of cycles have fallen within said predetermined high frequency range and stopping said high frequency counting means from counting pulses.

6. A multifrequency-to-digital converter as claimed in claim 5 wherein said symmetry counter and decoder determines whether cycles of said high frequency component are symmetrical and wherein said high frequency cycle counter is connected to said symmetry counter and decoder to receive the signal generated by said symmetry counter and decoder related to the number of high frequency cycles and count the number of high frequency cycles that are symmetrical.

7. A multifrequency-to-digital converter as claimed in claim 6 wherein said memory means comprises:

a read-only memory for storing a plurality of binary words and for generating a parallel digital output related to each of said stored binary words in accordance with a control signal input;

a read-only memory parallel to serial register connected to the parallel digital output of said read-only memory to receive and convert the parallel digital output of said read-only memory into a serial digital signal; and, read-only memory counting means suitable for counting clock pulses and for generating control signals suitable for controlling which of the binary words stored in said read-only memory is received by said read-only memory parallel-to-serial register.

8. A multifrequency-to-digital converter as claimed in claim 7 wherein said comparing means comprises:

a decision logic circuit connected to said low and high frequency counting means and to said read-only memory parallel-to-serial register for comparing the counts in said high and low frequency counting means with the serial output of said ready-only parallel to serial register in a sequential manner so as to determine when a comparison exists; and, decoding apparatus connected to said read-only memory counting means and to said decision logic for decoding the control signal output of said read-only memory counting means when said decision logic determines that a comparison exists between the output of said read-only memory parallel-to-serial register and the output of one of said low frequency counting means and said high frequency counting means.

9. A multifrequency-to-digital converter as claimed in claim 8 wherein said decoding apparatus comprises:

master latches connected to said read-only memory counting means for storing a predetermined portion of the control signal output generated by said read-only memory counting means when said decision logic determines that a comparison exists between the output of said read-only memory parallel-to-serial register and the output of one of said low frequency counting means and said high frequency counting means;

a word file connected to said master latches for generating a work file signal in accordance with the portion of said control signal output stored by said master latches; and, an output decoder connected to said word file for generating a digital output on a plurality of lines in accordance with the work file signal generated by said word file.

10. A multifrequency-to-digital converter as claimed in claim 9 including a double detector and a power detector connected to said high and low frequency detect latches and controls for causing said high and low frequency detect latches and controls to recycle once the high and low frequency components have been found to be within said predetermined high and low frequency ranges for a predetermined number of cycles to determine for a second time whether or not the high and low frequency components fall within said predetermined high and low frequency ranges for a predetermined number of cycles.

11. A multifrequency-to-digital converter as claimed in claim 10 including:

a low frequency edge detector connected so as to receive said low frequency components and detect the beginning thereof and apply a signal to said low frequency bandpass counter in accordance therewith; and a high frequency edge detector and synchronizing circuit connected so as to receive said high frequency component and to apply a signal to said high frequency bandpass counter in accordance therewith.

12. A multifrequency-to-digital converter as claimed in claim 11 wherein said read-only memory counting means comprises:

a bit counter adapted to count clock pulses and generate pulse signals in accordance therewith; and, a read-only memory word counter adapted to count the pulse signals generated by said bit counter and, in accordance therewith, generate said control signal output, said bit counter and said read-only memory word counter being activated by an output from said double detector and power detector which occurs when said double detector and power detector determines that said high and low frequency components have proven to be within their respective predetermined ranges for two cycles of operation related to determining whether said high and low frequency components are within their respective predetermined ranges.

13. A multifrequency-to-digital converter as claimed in claim 3 wherein said counting means comprises:

low frequency counting means adapted to count clock pulses and generate a serial output signal related to the number of clock pulses counted over a predetermined number of cycles of said low frequency component;

a low frequency cycle counter connected to said low frequency decoder for counting the number of cycles determined by said low frequency decoder to be within said predetermined low frequency range;

a low frequency detect latch and control connected to said low frequency cycle counter and to said low frequency counting means for sensing when said low frequency cycle counter receives a signal from the low frequency decoder indicating that at least one cycle of the low frequency component has fallen within said predetermined low frequency range and causing said low frequency counting means to start counting pulses, and for determining when said low frequency cycle counter determines that a predetermined number of cycles have fallen within said predetermined low frequency range and stopping said low frequency counter means from counting pulses;

high frequency counting means adapted to count clock pulses and generate a serial output signal related to the number of clock pulses counted over a predetermined number of cycles of said high frequency component;

a high frequency cycle counter connected to said high frequency decoder for counting the number of cycles determined by said high frequency decoder to be within said predetermined high frequency range; and, a high frequency detect latch and control connected to said high frequency cycle counter and to said high frequency counting means for sensing when said high frequency cycle counter receives a signal from said high frequency decoder indicating that at least one cycle of said high frequency component has fallen within said predetermined high frequency range and causing said high frequency counting means to start counting pulses, and for determining when said high frequency cycle counter determines that a predetermined number of cycles have fallen within said predetermined high frequency and stopping said high frequency counting means from counting pulses.

14. A multifrequency-to-digital converter as claimed in claim 2 wherein said memory means comprises:

a read-only memory for storing a plurality of binary words and for generating a parallel digital output related to each of said stored binary words in accordance with a control signal output;

a read-only memory parallel-to-serial register connected to the parallel digital output of said read-only memory to receive and convert the parallel digital output of said read-only memory into a serial digital signal; and, read-only memory counting means suitable for counting clock pulses and for generating control signals suitable for controlling which of the binary words stored in said read-only memory is received by said read-only memory parallel-to-serial register.

15. A multifrequency-to-digital converter as claimed in claim 14 wherein said counting means comprises:

low frequency counting means adapted to count clock pulses and generate a serial output signal related to the number of clock pulses counted over a predetermined number of cycles of said low frequency component;

a low frequency cycle counter connected to said low frequency decoder for counting the number of cycles determined by said bandpass means to be within said predetermined low frequency range;

a low frequency detect latch and control connected to said low frequency cycle counter and to said low frequency counting means for sensing when said low frequency cycle counter receives a signal from said bandpass means indicating that at least one cycle of the low frequency component has fallen within said predetermined low frequency range and causing said low frequency counting means to start counting pulses, and for determining when said low frequency cycle counter determines that a predetermined number of cycles have fallen within said predetermined low frequency range and stopping said low frequency counter means from counting pulses;

high frequency counting means adapted to count clock pulses and generate a serial output signal related to the number of clock pulses counted over a predetermined number of cycles of said high frequency component;

a high frequency cycle counter connected to said high frequency decoder for counting the number of cycles determined by said bandpass means to be within said predetermined high frequency range; and, a high frequency detect latch and control connected to said high frequency cycle counter and to said high frequency counting means for sensing when said high frequency cycle counter receives a signal from said bandpass means indicating that at least one cycle of said high frequency component has fallen within said predetermined high frequency range and causing said high frequency counting means to start counting pulses, and for determining when said high frequency cycle counter determines that a predetermined number of cycles have fallen within said predetermined high frequency range and stopping said high frequency counting means from counting pulses.

16. A multifrequency-to-digital conversion means as claimed in claim 15 wherein said comparing means comprises:

a decision logic circuit connected to said low and high frequency counting means and to said read-only memory parallel-to-serial register for comparing the counts in said high and low frequency counting means with the serial output of said read-only parallel-to-serial register in a sequential manner so as to determine when a comparison exists; and, decoding apparatus connected to said counting means and to said decision logic for decoding the control signal output of said counting means when said decision logic determines that a comparison exists between the output of said read-only memory parallel-to-serial register and the output of one of said low frequency counting means and said high frequency counting means.

17. A multifrequency-to-digital converter as claimed in claim 16 wherein said decoding apparatus comprises:

master latches connected to said read-only memory counting means for storing a predetermined portion of the control signal output generated by said read-only memory counting means when said decision logic determines that a comparison exists between the output of said read-only memory parallel-to-serial register and the output of one of said low frequency counting means and said high frequency counting means;

a word file connected to said master latches for generating a work file signal in accordance with the portion of said control signal output stored by said master latches; and, an output decoder connected to said word file for generating a digital output on a plurality of lines in accordance with the word file signal generated by said word file.

18. A multifrequency-to-digital converter for converting a two component multifrequency signal into a digital signal representing said two components, said multifrequency-to-digital converter comprising:

1. bandpass means for determining whether said two components are within predetermined frequency ranges;
2. detecting means connected to said bandpass means for detecting when said bandpass means has determined that said two components are within said predetermined frequency ranges;
3. counting means adapted to receive pulses and connected to said detecting means for counting pulses over a predetermined number of cycles of said two components, said counting starting when said bandpass means determines that said components are within said predetermined frequency ranges; and,
4. decoding means connected to said counting means for decoding the number of pulses counted by said counting means over said predetermined number of cycles and, in accordance therewith, generating a digital signal, said decoding means including memory means for storing a plurality of different pulse counts; and, comparing means for sequentially comparing the pulse counts stored by said memory means with the pulse counts counted by said counting means and for generating an output signal when a comparison, within a predetermined range, is found.

19. A multifrequency-to-digital converter is claimed in claim 18 wherein said bandpass means comprises:

a first frequency bandpass counter connected to receive one of said components and generate a digital output related to the frequency of said component;

a first frequency decoder connected to said first frequency bandpass counter for decoding the digital output of said first frequency bandpass counter and generating a signal related to whether or not said one of said frequency components is within a predetermined first frequency range;

a second frequency bandpass counter connected to receive the other of said frequency components and generate a digital output related to the frequency of said component; and, a second frequency decoder connected to said second frequency bandpass counter for decoding the digital output of said second frequency bandpass counter and generating a signal related to whether or not said other of said frequency components is within a predetermined second frequency range.

20. A multifrequency-to-digital converter as claimed in claim 19 including a symmetry counter and decoder connected to receive one of said frequency components and determine whether or not said one of said frequency components is symmetrical and generate a signal related to whether or not said one of said frequency components is symmetrical.

21. A multifrequency-to-digital converter as claimed in claim 19 wherein said counting means comprises:

first frequency counting means adapted to count clock pulses and generate a serial output signal related to the number of clock pulses counted over a predetermined number of cycles of said one of said frequency components;

a first frequency cycle counter connected to said first frequency decoder for counting the number of cycles determined by said first frequency decoder to be within said predetermined first frequency range;

a first frequency detect latch and control connected to said first frequency cycle counter and to said first frequency counting means for sensing when said first frequency cycle counter receives a signal from the first frequency decoder indicating that at least one cycle of said one of said frequency components has fallen within said predetermined first frequency range and causing said first frequency counting means to start counting pulses, and for determining when said first frequency cycle counter determines that a predetermined number of cycles have fallen within said predetermined first frequency range and stopping said first frequency counting means from counting pulses;

second frequency counting means adapted to count clock pulses and generate a serial output signal related to the number of clock pulses counted over a predetermined number of cycles of said other of said frequency components;

a second frequency cycle counter connected to said second frequency decoder for counting the number of cycles determined by said second frequency decoder to be within said predetermined second frequency range; and, a second frequency detect latch and control connected to said second frequency cycle counter and to said second frequency counting means for sensing when said second frequency cycle counter receives a signal from said second frequency decoder indicating that at least one cycle of said other of said frequency components has fallen within said predetermined second frequency range and causing said frequency counting means to start counting pulses, and for determining when said second frequency cycle counter determines that a predetermined number of cycles have fallen within said predetermined second frequency range and stopping said second frequency counting means from counting pulses.

22. A multifrequency-to-digital converter as claimed in claim 21 wherein said memory means comprises:

a read-only memory for storing a plurality of binary words and for generating a parallel digital output related to each of said stored binary words in accordance with a control signal input;

a read-only memory parallel-to-serial register connected to the parallel digital output of said read-only memory to receive and convert the parallel digital output of said read-only memory into a serial digital signal; and, read-only memory counting means suitable for counting clock pulses and for generating control signals suitable for controlling which of the binary words stored in said read-only memory is received by said read-only memory parallel-to-serial register.

23. A multifrequency-to-digital conversion means as claimed in claim 22 wherein said comparing means comprises:

a decision logic circuit connected to said first and second frequency counters and to said read-only memory parallel-to-serial register for comparing the counts in said first and second frequency counters with the serial output of said read-only parallel-to-serial register in a sequential manner so as to determine when a comparison exists; and, decoding apparatus connected to said read-only memory counting means and to said decision logic for decoding the control signal output of said read-only memory counting means when said decision logic determines that a comparison exists between the output of said read-only memory parallel-to-serial register and the output of one of said first frequency counting means and said second frequency counting means.

24. A multifrequency-to-digital converter as claimed in claim 23, wherein said decoding apparatus comprises:

master latches connected to said read-only memory counting means for storing predetermined portions of the control signal output generated by said read-only memory counting means when said decision logic determines that a comparison exists between the output of said read-only memory parallel-to-serial register and the output of said first frequency counting means and said second frequency counting means;

a word file connected to said master latches for generating a word file signal in accordance with the portion of said control signal output stored by said master latches; and, an output decoder connected to said word file for generating a digital output on a plurality of lines in accordance with the word file signal generated by said word file.

25. A multifrequency-to-digital converter as claimed in claim 24, including a double detector and a power detector connected to said first and second frequency detect latches and controls for causing said first and second frequency detect latches and controls to recycle once the first and second frequency components have been found to be within their respective predetermined frequency ranges for a predetermined number of cycles to determine for a second time whether or not the first and second frequency components fall with their respective predetermined frequency ranges for a predetermined number of cycles.

* * * * *

UNITED STATES PATENT OFFICE

CERTIFICATE OF CORRECTION

PATENT NO. : 3,912,869

DATED : October 14, 1975

INVENTOR(S) : Richard J. Ullakko

It is certified that error appears in the above-identified patent and that said Letters Patent are hereby corrected as shown below:

In the Specification:

Column 2, line 64, delete "preferred" and insert --system--;

Column 9, lines 29 and 30, delete "interst" and insert --interest--.

In the Claims:

Column 29, line 26, delete "components" and insert --component--;
line 57, delete "components" and insert --component--.

Column 31, line 24, delete "work" and insert --word--;
line 29, delete "work" and insert --word--.

Signed and Sealed this

*thirteenth* Day of *January 1976*

[SEAL]

*Attest:*

RUTH C. MASON
*Attesting Officer*

C. MARSHALL DANN
*Commissioner of Patents and Trademarks*